US007802281B1

(12) United States Patent
Tani et al.

(10) Patent No.: US 7,802,281 B1
(45) Date of Patent: Sep. 21, 2010

(54) INFORMATION PROVIDING APPARATUS AND METHOD, INFORMATION RECEIVING APPARATUS AND METHOD, LOTS-DRAWING SYSTEM AND METHOD AND MEDIUM

(75) Inventors: Nobutaka Tani, Saitama (JP); Masahiro Tada, Kanagawa (JP); Hirotaka Sugiyama, Tokyo (JP); Tadashi Saito, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/572,814

(22) Filed: May 17, 2000

(30) Foreign Application Priority Data

May 18, 1999 (JP) ................................ P11-137202

(51) Int. Cl.
H04N 7/10 (2006.01)
(52) U.S. Cl. ............................. 725/36; 725/34; 725/60; 463/16; 463/22
(58) Field of Classification Search .............. 725/32–36, 725/60–61; 463/16–19, 22–42
See application file for complete search history.

(56) References Cited

U.S. PATENT DOCUMENTS

| 4,701,914 | A | * | 10/1987 | Matsushita ...................... 714/6 |
| 4,937,853 | A | * | 6/1990 | Brule et al. .................... 463/17 |
| 4,977,445 | A | * | 12/1990 | Kawai ......................... 348/505 |
| 5,179,517 | A | * | 1/1993 | Sarbin et al. ................... 463/25 |
| 5,486,930 | A | * | 1/1996 | Iketani et al. ................. 386/95 |
| 5,624,316 | A | * | 4/1997 | Roskowski et al. ........... 463/45 |
| 5,684,526 | A | * | 11/1997 | Yoshinobu ................... 725/131 |
| 5,722,890 | A | * | 3/1998 | Libby et al. ................... 463/17 |
| 5,762,552 | A | * | 6/1998 | Vuong et al. .................. 463/25 |
| 5,794,219 | A | * | 8/1998 | Brown ......................... 705/37 |
| 5,822,425 | A | * | 10/1998 | Ezaki et al. ................... 386/94 |
| 5,855,516 | A | * | 1/1999 | Eiba ............................ 463/42 |
| 5,870,155 | A | * | 2/1999 | Erlin .......................... 348/734 |
| 5,882,260 | A | * | 3/1999 | Marks et al. .................. 463/13 |

(Continued)

FOREIGN PATENT DOCUMENTS

JP 9 93555 4/1997

(Continued)

OTHER PUBLICATIONS

Ten Kate et al, Transmission and reception of television programs, Nov. 26, 1998, PCT, WO 98/53611.*

Primary Examiner—Annan Q Shang
(74) Attorney, Agent, or Firm—Frommer Lawrence & Haug LLP; William S. Frommer; Thomas F. Presson

(57) ABSTRACT

The invention makes it possible to draw lots for a present in real time in association with a broadcast program. A broadcasting station broadcasts information relating to lot for a present that is associated with a broadcast program by superimposing it on a video signal in vertical blanking intervals. The lot information is decoded by a decoder and viewed by a viewer on a TV receiver. When the viewer commands the decoder to enter the lot for the present, the decoder accesses a present call center and an automatic lots-drawing system draws lots. A drawing result is transmitted to the broadcasting station and announced during the broadcast of the program. A sponsor sends the present product to winner viewers based on winner data.

19 Claims, 17 Drawing Sheets

U.S. PATENT DOCUMENTS

| | | | | |
|---|---|---|---|---|
| 5,889,950 | A * | 3/1999 | Kuzma | 725/37 |
| 5,915,243 | A * | 6/1999 | Smolen | 705/14 |
| 5,978,013 | A * | 11/1999 | Jones et al. | 725/23 |
| 6,031,545 | A * | 2/2000 | Ellenby et al. | 345/632 |
| 6,057,872 | A * | 5/2000 | Candelore | 725/23 |
| 6,131,086 | A * | 10/2000 | Walker et al. | 705/26 |
| 6,184,877 | B1 * | 2/2001 | Dodson et al. | 725/110 |
| 6,193,605 | B1 * | 2/2001 | Libby et al. | 463/17 |
| 6,203,011 | B1 * | 3/2001 | Nulph | 273/138.2 |
| 6,209,028 | B1 * | 3/2001 | Walker et al. | 709/219 |
| 6,223,026 | B1 * | 4/2001 | Martschitsch | 455/407 |
| 6,240,555 | B1 * | 5/2001 | Shoff et al. | 725/110 |
| 6,263,501 | B1 * | 7/2001 | Schein et al. | 725/39 |
| 6,263,505 | B1 * | 7/2001 | Walker et al. | 725/110 |
| 6,264,560 | B1 * | 7/2001 | Goldberg et al. | 463/42 |
| 6,280,325 | B1 * | 8/2001 | Fisk | 463/19 |
| 6,285,407 | B1 * | 9/2001 | Yasuki et al. | 348/554 |
| 6,287,199 | B1 * | 9/2001 | McKeown et al. | 463/40 |
| 6,317,881 | B1 * | 11/2001 | Shah-Nazaroff et al. | 725/24 |
| 6,357,042 | B2 * | 3/2002 | Srinivasan et al. | 725/32 |
| 6,416,414 | B1 * | 7/2002 | Stadelmann | 463/42 |
| 6,438,233 | B1 * | 8/2002 | Yoshimune et al. | 380/241 |
| 6,449,346 | B1 * | 9/2002 | Katz | 379/93.12 |
| 6,453,167 | B1 * | 9/2002 | Michaels et al. | 455/466 |
| 6,487,721 | B1 * | 11/2002 | Safadi | 725/36 |
| 6,496,981 | B1 * | 12/2002 | Wistendahl et al. | 725/112 |
| 6,564,379 | B1 * | 5/2003 | Knudson et al. | 725/42 |
| 6,567,982 | B1 * | 5/2003 | Howe et al. | 725/100 |
| 6,628,302 | B2 * | 9/2003 | White et al. | 715/717 |
| 6,698,020 | B1 * | 2/2004 | Zigmond et al. | 725/34 |
| 6,738,978 | B1 * | 5/2004 | Hendricks et al. | 725/35 |
| 6,816,172 | B1 * | 11/2004 | Iki et al. | 715/716 |
| 7,007,076 | B1 * | 2/2006 | Hess et al. | 709/219 |
| 7,096,426 | B1 * | 8/2006 | Lin-Hendel | 715/711 |
| 7,162,446 | B1 * | 1/2007 | Handler | 705/37 |
| 2004/0261127 | A1 * | 12/2004 | Freeman et al. | 725/135 |

FOREIGN PATENT DOCUMENTS

| | | |
|---|---|---|
| JP | 9 93563 | 4/1997 |
| JP | 9 98402 | 4/1997 |
| JP | 10 51752 | 2/1998 |
| JP | 10 243376 | 9/1998 |

* cited by examiner

INFORMATION PROVIDING APPARATUS AND METHOD, INFORMATION RECEIVING APPARATUS AND METHOD, LOTS-DRAWING SYSTEM AND METHOD AND MEDIUM

BACKGROUND OF THE INVENTION

1. Field of the Invention

The present invention relates to an information providing apparatus and method, an information receiving apparatus and method, a lots-drawing system and method, and a medium. In particular, the invention relates to an information providing apparatus and method, an information receiving apparatus and method, a lots-drawing system and method, and a medium that make it possible to draw lots quickly.

2. Description of the Related Art

In television broadcast etc., to attract attention of viewers to a program being broadcast, various goods are sometimes presented to viewers by lot. This can be a measure of motivating viewers to watch the program to its end.

However, in conventional broadcasting systems, a common way for viewers to enter such lot is write a letter. This results in a problem that it takes long time for a program provider to collect information relating to the program or entries to the lot for the present and hence it is difficult for them to recognize responses in real time.

SUMMARY OF THE INVENTION

An information providing apparatus according to the invention comprises first combining means for combining information relating to lot with information of a broadcast program to be provided, and outputting combined information; receiving means for receiving information of a result of the lot; and second combining means for combining, when the receiving means receives the information of the result of the lot, the information of the result of the lot with information of the broadcast program, and outputting combined information.

The information providing apparatus according to the invention may further comprise third combining means for combining a signal indicating a time point when to display the information relating to the lot with information of the broadcast program, and outputting combined information.

The first combining means may insert the information relating to the lot into blanking intervals of the information of the broadcast program, and the second combining means may superimpose the information of the result of the lot on an effective portion of a video signal of the broadcast program.

An information providing method according to the invention comprises a first combining step of combining information relating to lot with information of a broadcast program to be provided, and outputting combined information; a receiving step of receiving information of a result of the lot; and a second combining step of combining, when the information of the result of the lot is received in the receiving step, the information of the result of the lot with information of the broadcast program, and outputting combined information.

A program of a medium according to the invention comprises a first combining step of combining information relating to lot with information of a broadcast program to be provided, and outputting combined information; a receiving step of receiving information of a result of the lot; and a second combining step of combining, when the information of the result of the lot is received in the receiving step, the information of the result of the lot with information of the broadcast program, and outputting combined information.

An information receiving apparatus according to the invention comprises extracting means for extracting information relating to lot that is included in information of a broadcast program being provided; display control means for generating a message based on the information relating to the lot that has been extracted by the extracting means, and displaying the message; entry judging means for judging whether an instruction to enter the lot has been input; storing means for storing information of an entry destination of the lot; and execution means for performing an operation of entering the lot by communicating with the entry destination that is stored in the storing means based on a judgment result of the entry judging means.

The storing means may further store an access destination to be accessed in buying a product corresponding to the lot, and the information receiving apparatus may further comprise purchase judging means for judging whether an instruction to buy the product corresponding to the lot has been input; and accessing means for performing an operation of accessing the access destination that is stored in the storing means based on a judgment result of the purchase judging means.

An information receiving method according to the invention comprises an extracting step of extracting information relating to lot that is included in information of a broadcast program being provided; a display control step of generating a message based on the information relating to the lot that has been extracted by the extracting step, and displaying the message; an entry judging step of judging whether an instruction to enter the lot has been input; a storing step of storing information of an entry destination of the lot; and an execution step of performing an operation of entering the lot by communicating with the entry destination that was stored in the storing step based on a judgment result of the entry judging step.

A program of a medium according to the invention comprises an extracting step of extracting information relating to lot that is included in information of a broadcast program being provided; a display control step of generating a message based on the information relating to the lot that has been extracted by the extracting step, and displaying the message; an entry judging step of judging whether an instruction to enter the lot has been input; a storing step of storing information of an entry destination of the lot; and an execution step of performing an operation of entering the lot by communicating with the entry destination that was stored in the storing step based on a judgment result of the entry judging step.

An information processing apparatus according to the invention comprises entry accepting means for accepting an entry corresponding to information relating to lot that is included in information of a broadcast program being provided; determining means for determining winners of the lot from entrants accepted by the entry accepting means; and output means for outputting a determination result of the determining means to a provider of the broadcast program while the broadcast program is being provided.

The information processing apparatus may further comprise purchase accepting means for accepting a purchase order for a product corresponding to the lot; and transmitting means for transmitting information of a person who has made the purchase order that has been accepted by the purchase accepting means to a sponsor of the product corresponding to the lot in response to acceptance by the purchase accepting means.

An information processing method according to the invention comprises an entry accepting step of accepting an entry corresponding to information relating to lot that is included in information of a broadcast program being provided; a determining step of determining winners of the lot from entrants accepted by the entry accepting step; and an output step of outputting a determination result of the determining step to a provider of the broadcast program while the broadcast program is being provided.

A program of a medium according to the invention comprises an entry accepting step of accepting an entry corresponding to information relating to lot that is included in information of a broadcast program being provided; a determining step of determining winners of the lot from entrants accepted by the entry accepting step; and an output step of outputting a determination result of the determining step to a provider of the broadcast program while the broadcast program is being provided.

A lots-drawing system according to the invention in which an information providing apparatus provides information of a broadcast program to an information receiving apparatus together with information relating to lot, and an information processing apparatus accepts an entry to the lot from the information receiving apparatus and draws lots, comprises the information providing apparatus comprising first combining means for combining information relating to lot with information of a broadcast program to be provided, and outputting combined information; receiving means for receiving information of a result of the lot from the information processing apparatus; and second combining means for combining, when the receiving means receives the information of the result of the lot, the information of the result of the lot with information of the broadcast program, and outputting combined information; the information receiving apparatus comprising extracting means for extracting the information relating to the lot that is included in the information of the broadcast program being provided by the information providing apparatus; display control means for generating a message based on the information relating to the lot that has been extracted by the extracting means, and displaying the message; entry judging means for judging whether an instruction to enter the lot has been input; storing means for storing information of an entry destination of the lot; and execution means for performing an operation of entering the lot by communicating with the entry destination that is stored in the storing means based on a judgment result of the entry judging means; and the information processing apparatus comprising entry accepting means for accepting an entry corresponding to the information relating to the lot that is included in the information of the broadcast program being provided by the information providing apparatus; determining means for determining winners of the lot from entrants accepted by the entry accepting means; and output means for outputting a determination result of the determining means to the information providing apparatus while the broadcast program is being provided.

A lots-drawing method according to the invention in which an information providing apparatus provides information of a broadcast program to an information receiving apparatus together with information relating to lot, and an information processing apparatus accepts an entry to the lot from the information receiving apparatus and draws lots, comprises, in the information providing apparatus, a first combining step of combining information relating to lot with information of a broadcast program to be provided, and outputting combined information; a receiving step of receiving information of a result of the lot from the information processing apparatus; and a second combining step of combining, when the information of the result of the lot is received in the receiving step, the information of the result of the lot with information of the broadcast program, and outputting combined information. The lots-drawing method comprises, in the information receiving apparatus, an extracting step of extracting the information relating to the lot that is included in the information of the broadcast program being provided by the information providing apparatus; a display control step of generating a message based on the information relating to the lot that has been extracted by the extracting step, and displaying the message; an entry judging step of judging whether an instruction to enter the lot has been input; a storing step of storing information of an entry destination of the lot; and an execution step of performing an operation of entering the lot by communicating with the entry destination that was stored in the storing step based on a judgment result of the entry judging step. The lots-drawing method comprises, in the information processing apparatus, an entry accepting step of accepting an entry corresponding to the information relating to the lot that is included in the information of the broadcast program being provided by the information providing apparatus; a determining step of determining winners of the lot from entrants accepted by the entry accepting step; and an output step of outputting a determination result of the determining step to the information providing apparatus while the broadcast program is being provided.

A medium according to the invention is used in a lots-drawing system in which an information providing apparatus provides information of a broadcast program to an information receiving apparatus together with information relating to lot, and an information processing apparatus accepts an entry to the lot from the information receiving apparatus and draws lots, wherein the medium causes the information providing apparatus to execute a program comprising a first combining step of combining information relating to lot with information of a broadcast program to be provided, and outputting combined information; a receiving step of receiving information of a result of the lot from the information processing apparatus; and a second combining step of combining, when the information of the result of the lot is received in the receiving step, the information of the result of the lot with information of the broadcast program, and outputting combined information. The medium causes the information receiving apparatus to execute a program comprising an extracting step of extracting the information relating to the lot that is included in the information of the broadcast program being provided by the information providing apparatus; a display control step of generating a message based on the information relating to the lot that has been extracted by the extracting step, and displaying the message; an entry judging step of judging whether an instruction to enter the lot has been input; a storing step of storing information of an entry destination of the lot; and an execution step of performing an operation of entering the lot by communicating with the entry destination that was stored in the storing step based on a judgment result of the entry judging step. The medium causes the information processing apparatus to execute a program comprising an entry accepting step of accepting an entry corresponding to the information relating to the lot that is included in the information of the broadcast program being provided by the information providing apparatus; a determining step of determining winners of the lot from entrants accepted by the entry accepting step; and an output step of outputting a determination result of the determining step to the information providing apparatus while the broadcast program is being provided.

As described above, in the information providing apparatus and method and the medium according to the invention, information relating to lot is combined with information of a broadcast program to be provided and combined information is output. When information of a result of the lot is received, the information of the result of the lot is combined with information of the broadcast program and combined information is output. Therefore, lots can be drawn in real time in association with a program being broadcast.

In the information receiving apparatus and method and the medium according to the invention, information relating to lot that is included in information of a broadcast program is extracted, a message included in the extracted information relating to the lot is displayed, and entry is made by communicating with a stored entry destination based on a result of a judgment as to whether an instruction to enter the lot has been input. Therefore, viewers can enter, in real time, lot that is conducted in association with a broadcast program being provided.

In the information processing apparatus and method and the medium according to the invention, an entry corresponding to information relating to lot that is included in information of a broadcast program being provided is accepted, winners are determined from entrants, and a determination result is output to a provider of the broadcast program during the program is being provided. Therefore, responses to information relating to lot that is conducted in association with the broadcast program can be received in real time.

In the lots-drawing system and method and the medium according to the invention, the information providing apparatus combines information relating to lot with information of a broadcast program to be provided and outputs combined information. The information receiving apparatus displays a message included in the information relating to the lot. When an instruction to enter the lot is input, the information receiving apparatus makes an entry by communicating with a stored entry destination. The information processing apparatus accepts entries, determines winners from accepted entrants, and outputs a determination result to a provider of the broadcast program while the program is being provided. Therefore, a lots-drawing system can be realized which can draw lots in real time in association with a broadcast program being provided.

DETAILED DESCRIPTION OF THE PREFERRED EMBODIMENTS

Figure 1:
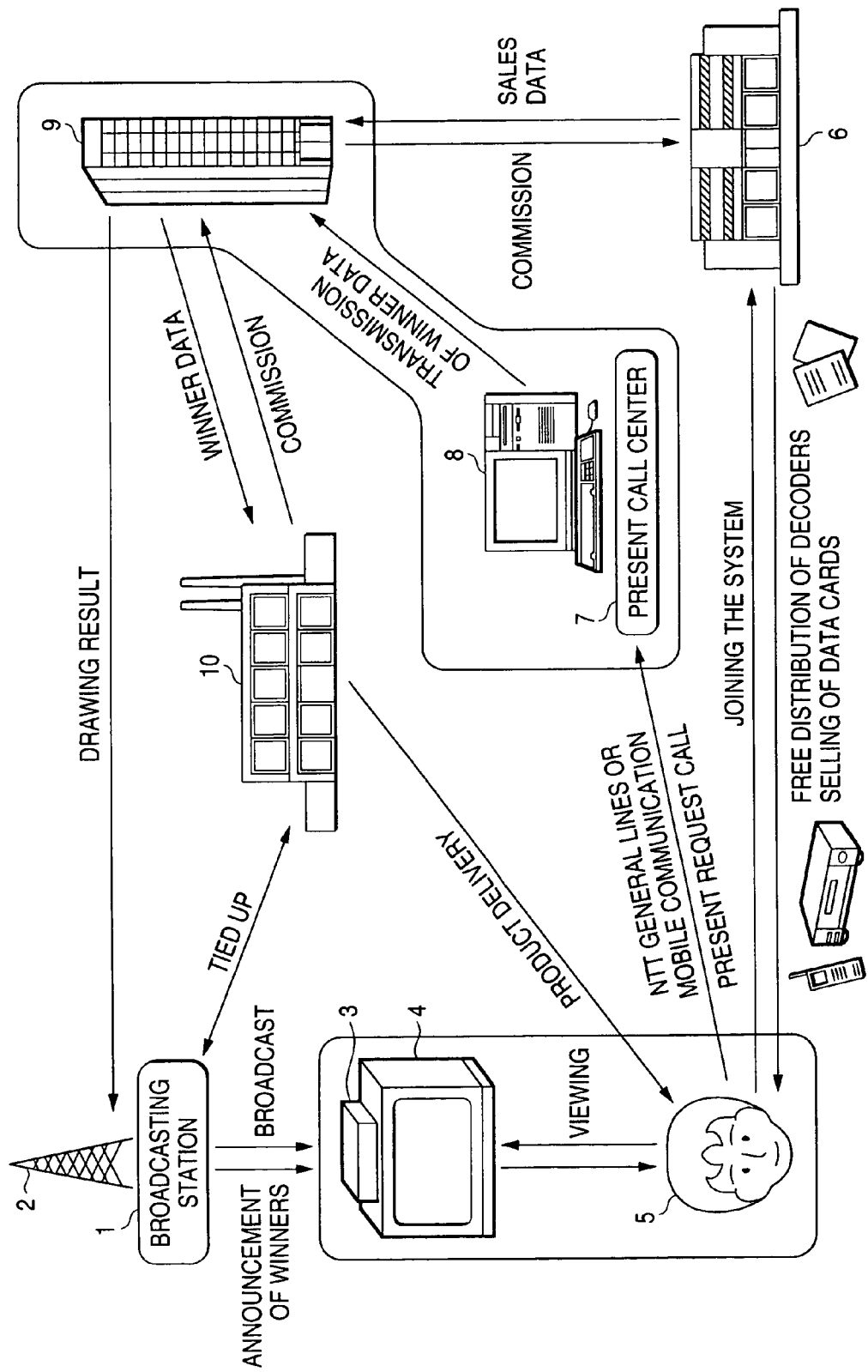
FIG. 1 shows an example configuration of a lots-drawing system according to the present invention.

FIG. 1 shows an example configuration of a lots-drawing system according to the present invention. A broadcasting station 1 transmits a video signal of a prescribed program and a corresponding audio signal via an antenna 2. Information relating to presentation of a product that is marketed by a prescribed sponsor 10 is superimposed on the video signal in vertical blanking intervals, for example.

In each home, information of the program provided (broadcast) by the broadcasting station 1 is received and decoded by a decoder 3 and output to and displayed on a TV receiver 4. The decoder 3 is given to a viewer 5 free of charge when he makes a necessary procedure for joining this information providing system in a convenience store 6, for example. At this time, a data card 53 (described later with reference to FIG. 4) to be mounted in the decoder 3 is sold.

When the viewer 5 has joined the information providing system, the manager of the convenience store 6 transmits the related information and sales data to a network manager 9 and receives a prescribed commission from the network manager 9. The network manager 9 manages a present call center 7 having an automatic lots-drawing system 8. When the viewer 5 accesses the present call center 7 by using a home telephone or a mobile communication device such as a mobile telephone to enter lot that is associated with a program being broadcast, the automatic lots-drawing system 8 determines some of a plurality of entrants as winners of a present and sends a drawing result to the network manager 9. The data of the winners is transmitted from the network manager 9 (or the automatic lots-drawing system 8) to the broadcasting station 1. The broadcasting station 1 broadcasts the information of the winners according to the drawing result that is supplied from the network manager 9 by superimposing it on a video signal of the program.

The network manager 9 supplies the winner data to a sponsor 10, who sends a present product to the winners (viewers 5). Further, the network manager 9 receives, from the sponsor 10, as a commission, a fee for the use of the present lots-drawing system.

Figure 2:
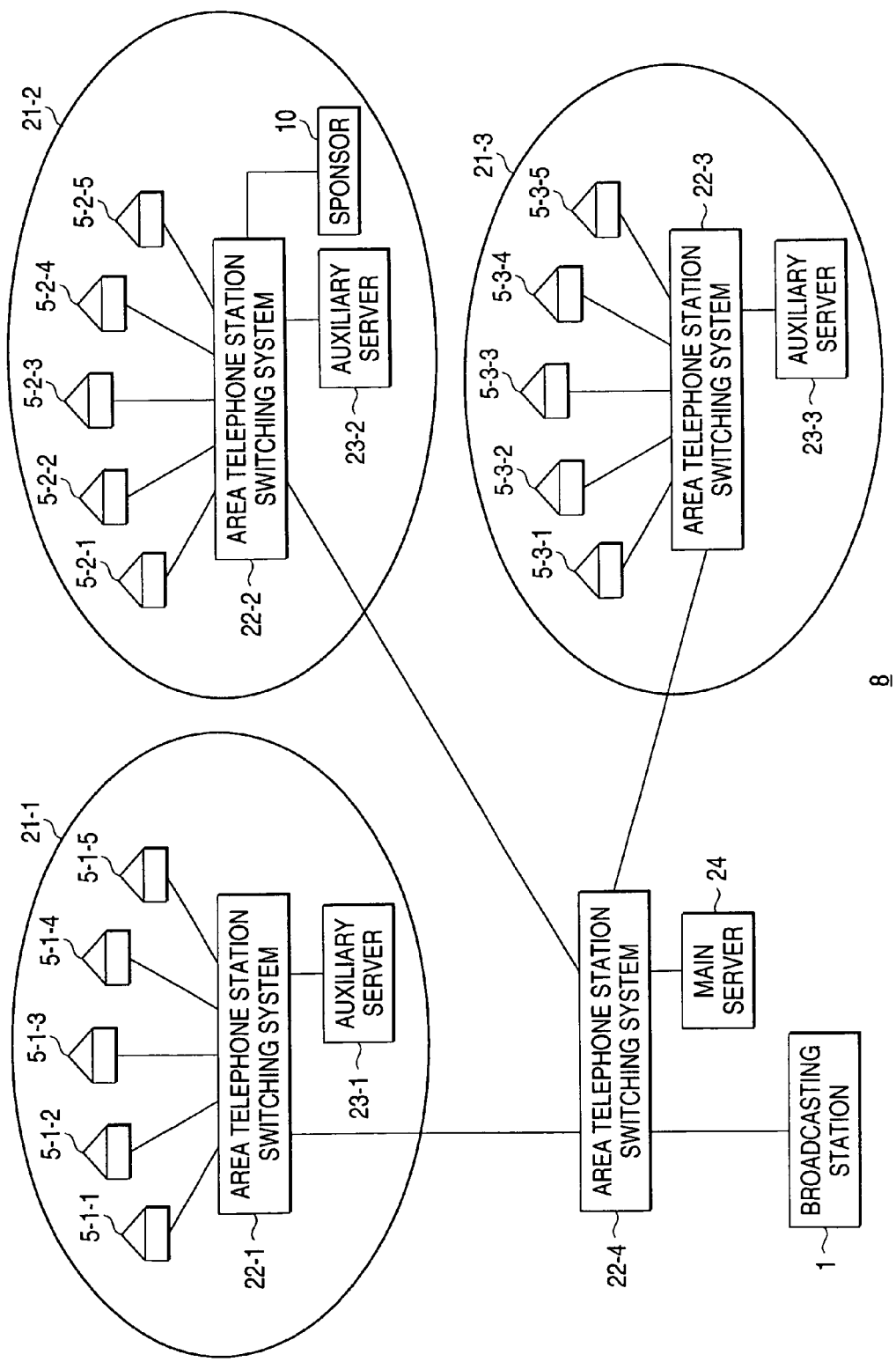
FIG. 2 shows an example configuration of an automatic lots-drawing system shown in FIG. 1.

For example, the automatic lots-drawing system is configured as shown in FIG. 2. Areas 21-1 to 21-3 of prescribed stations are formed in a range where radio waves transmitted from the broadcasting station 1 can be received. Viewers 5-1-1 to 5-1-5 are located in the area 21-1. To enter lot, the viewers 5-1-1 to 5-1-5 access an auxiliary server 23-1 that is connected to an area telephone station switching system 22-1 that controls the area 21-1.

Similarly, to enter lot, viewers 5-2-1 to 5-2-5 in the area 21-2 access an auxiliary server 23-2 via an area telephone station switching system 22-2 that controls the area 21-2. To enter lot, viewers 5-3-1 to 5-3-5 in the area 21-3 access an auxiliary server 23-3 via an area telephone station switching system 22-3 that controls the area 21-3. In this example, the sponsor 10 is connected to the area telephone station switching system 22-2 in the area 21-2.

Each of the auxiliary servers 23-1 to 23-3 in the respective areas 21-1 to 21-3 draws lots for entrants in the corresponding area and outputs a drawing result to a main server 24 via an area telephone station switching system 22-4. The broadcasting station 1 is connected to the area telephone station switching system 22-4. The main server 24 further draws lots based on the drawing results supplied from the auxiliary servers 23-1 to 23-3.

In FIG. 2, the auxiliary servers 23-1 to 23-3 correspond to the present call center 7 in FIG. 1.

Figure 3:
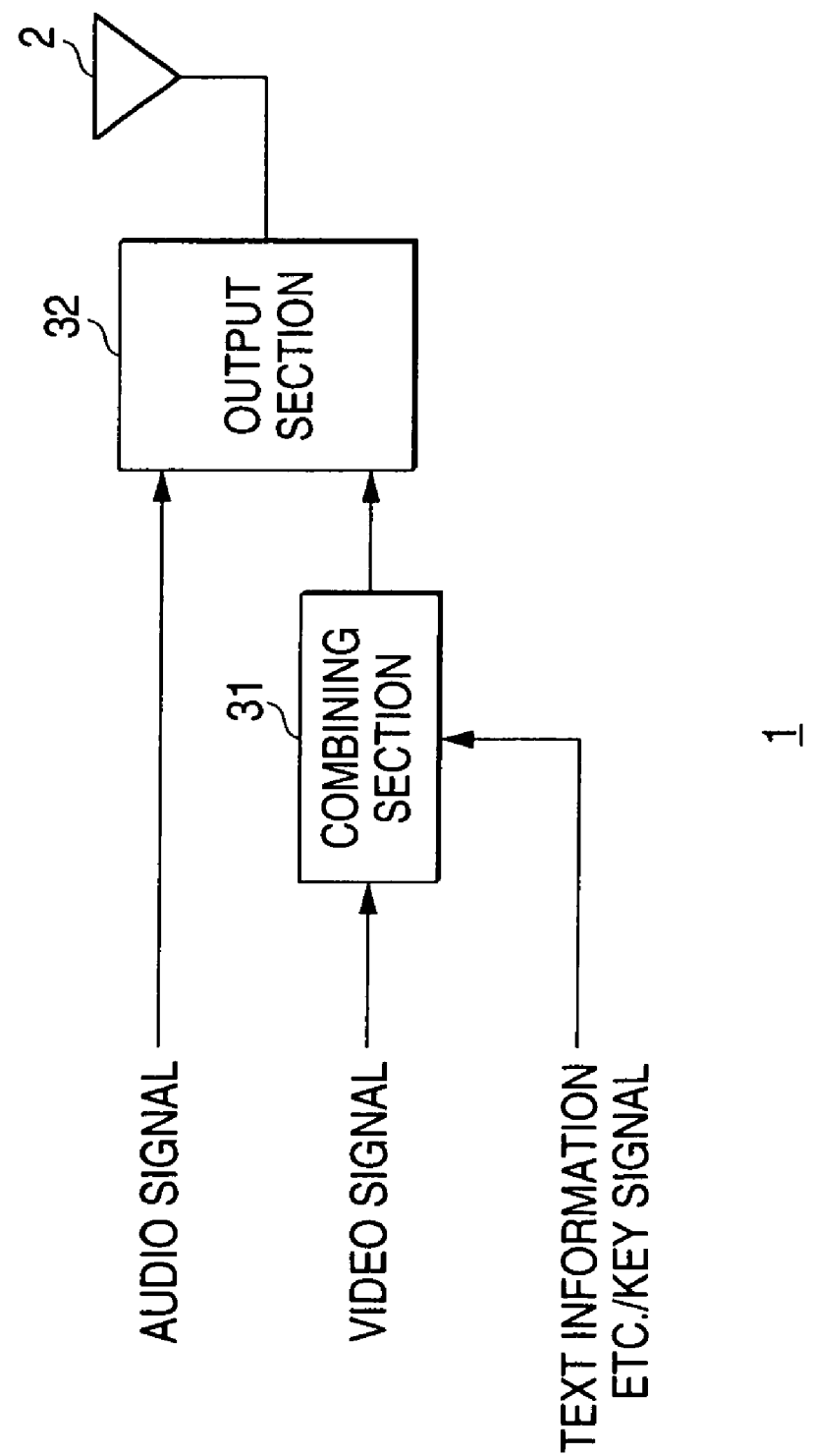
FIG. 3 is a block diagram showing an example configuration of a broadcasting station shown in FIG. 1.

FIG. 3 shows an example configuration of the broadcasting station 1. A combining section 31 superimposes text information, a key signal, etc. on a video signal of a program to be broadcast in vertical blanking intervals or prescribed horizontal periods and outputs a resulting signal to an output section 32. The output section 32 modulates the video signal received from the combining section 31 and a corresponding audio signal into an RF signal and transmits it to homes by radio waves.

Figure 4:
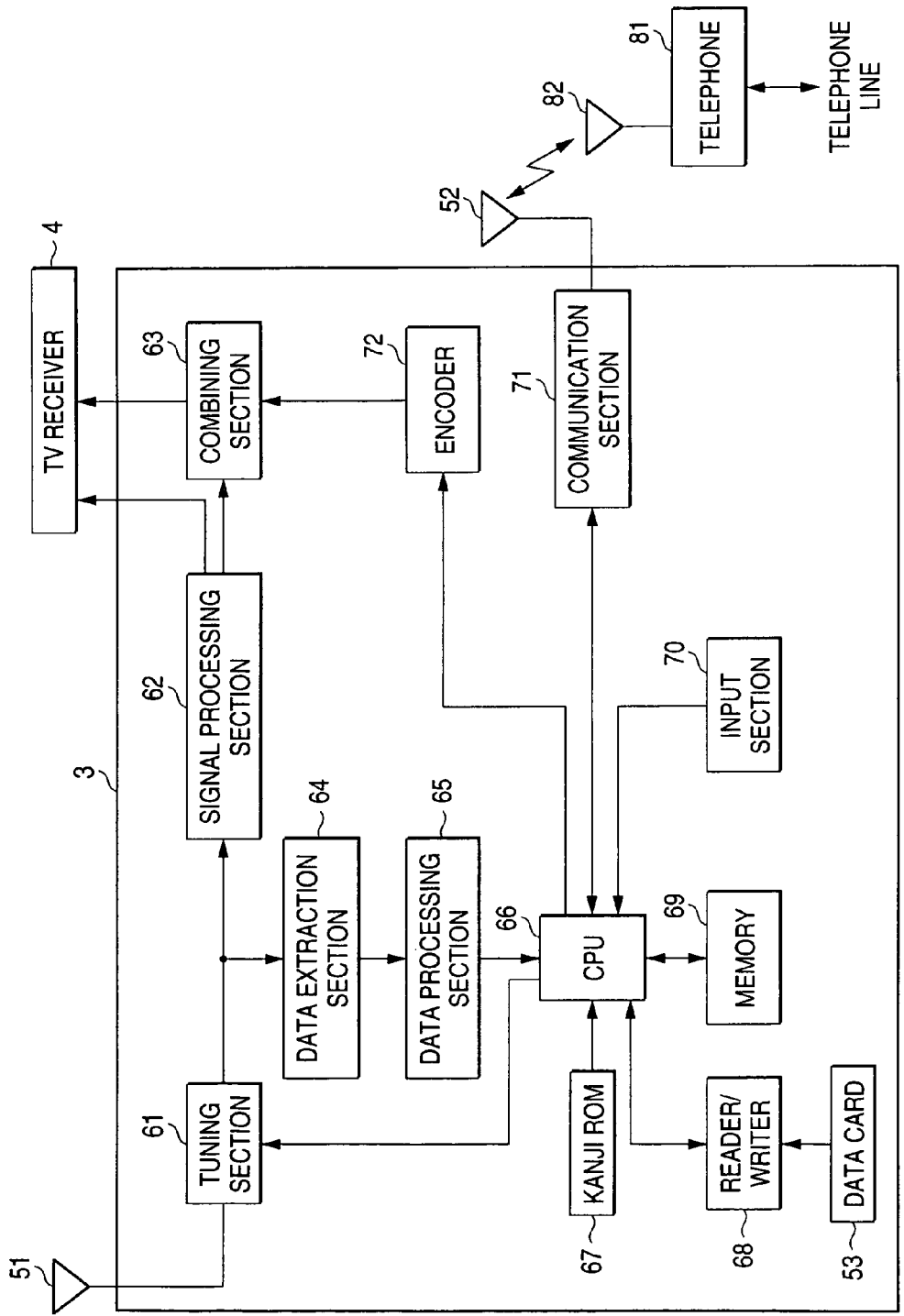
FIG. 4 is a block diagram showing an example configuration of a decoder shown in FIG. 1.

FIG. 4 shows an example configuration of the decoder 3. When receiving, with an antenna 51, radio waves that are transmitted from the antenna 2 of the broadcasting station 1, the decoder 3 supplies a resulting reception signal to a tuning section 61. The tuning section 61 extracts a signal on a prescribed channel in accordance with an instruction from a CPU 66 and outputs it to a signal processing section 62 and a data extraction section 64.

The signal processing section 62 demodulates the signal received from the tuning section 61, and supplies a resulting video signal to the TV receiver 4 via a combining section 63 and a resulting audio signal directly to the TV receiver 4.

The data extraction section 64 extracts data superimposed on the received signal in vertical blanking intervals and outputs it to a data processing section 65. The data processing section 65 processes the data received from the data extraction section 64 into data that can be read by the CPU 66 and outputs it to the CPU 66.

The CPU 66 generates a message while reading out kanji data from a kanji ROM (read-only memory) 67 when necessary, and outputs it to an encoder 72. The encoder 72 converts (encodes) the signal received from the CPU 66 into an NTSC video signal and outputs it to the combining section 63 to cause the combining section 63 to combine the NTSC video signal of the message with the video signal that is supplied from the signal processing section 62.

A memory 69 stores, when necessary, viewer information such as the address, telephone number, and name of the user (viewer)) that is input through an input section 70 as well as programs and data that are necessary for the CPU 66 to execute various processes. A reader/writer 68 writes and reads data to and from a data card 53 that the user buys at the convenience store 6. A program and data that are necessary when the decoder 3 performs an operation of entering lot for a present are stored in the data card 53 in advance.

A communication section 71, which is a modem, for example, communicates, via an antenna 52, by radio, with a telephone 81 having an antenna 82 and can thereby communicate with an external apparatus (e.g., the present call center 7) over a telephone line.

Figure 5:
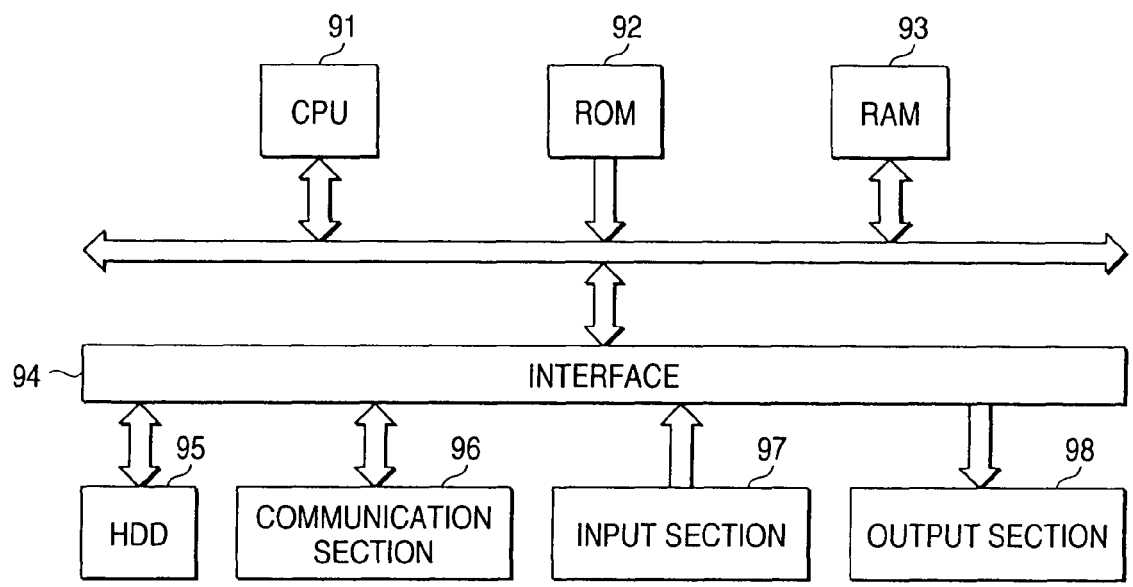
FIG. 5 is a block diagram showing an example configuration of a main server shown in FIG. 2.

FIG. 5 shows an example configuration of the main server 24. A CPU 91 performs various operations according to programs stored in a ROM 92. A RAM (random access memory) 93 stores, when necessary, a program and data that are necessary when the CPU 91 performs any of various operations.

An interface 94 interfaces between the CPU 91 and a hard disk drive (HDD) 95, a communication section 96, an input section 97, and an output section 98.

The hard disk drive 95 records and reproduces various kinds of information on and from hard disks incorporated therein. The communication section 96 communicates with another apparatus over a telephone line or a dedicated line. The input section 97 is manipulated by a user (i.e., the manager of the main server 24) when he makes an input for any of various processes to the CPU 91. The output section 98 is composed of a display, a speaker, etc. and outputs a picture and a sound.

Basically the auxiliary servers 23-1 to 23-3 are configured in the same manner as the main server 24 and their configuration will not be described. Therefore, when necessary, the configuration of FIG. 5 may be referred to below when necessary also as the configuration of the auxiliary servers 23-1 to 23-3.

Figure 6:
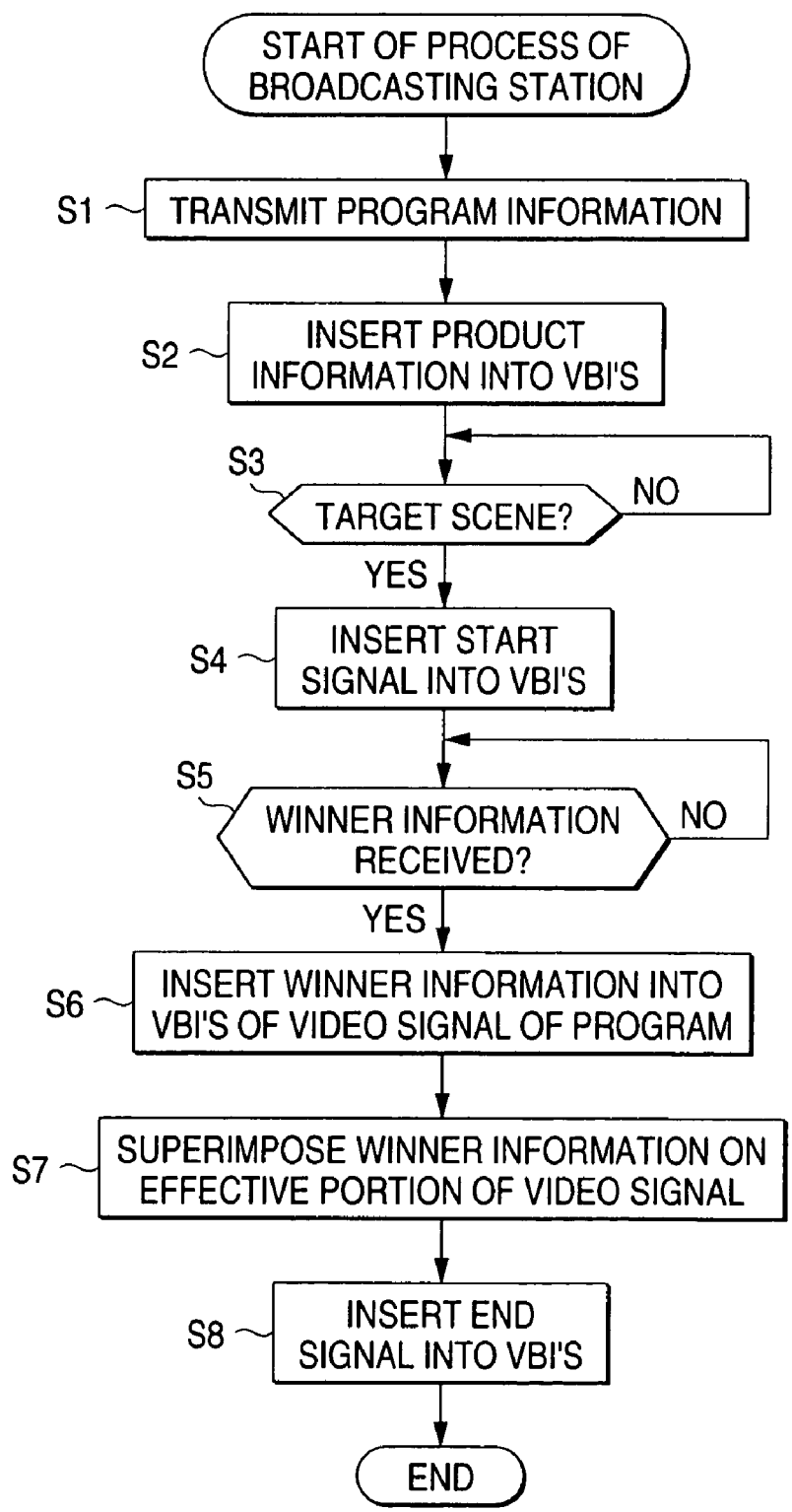
FIG. 6 is a flowchart showing the process of the broadcasting station of FIG. 3.
Figure 7:
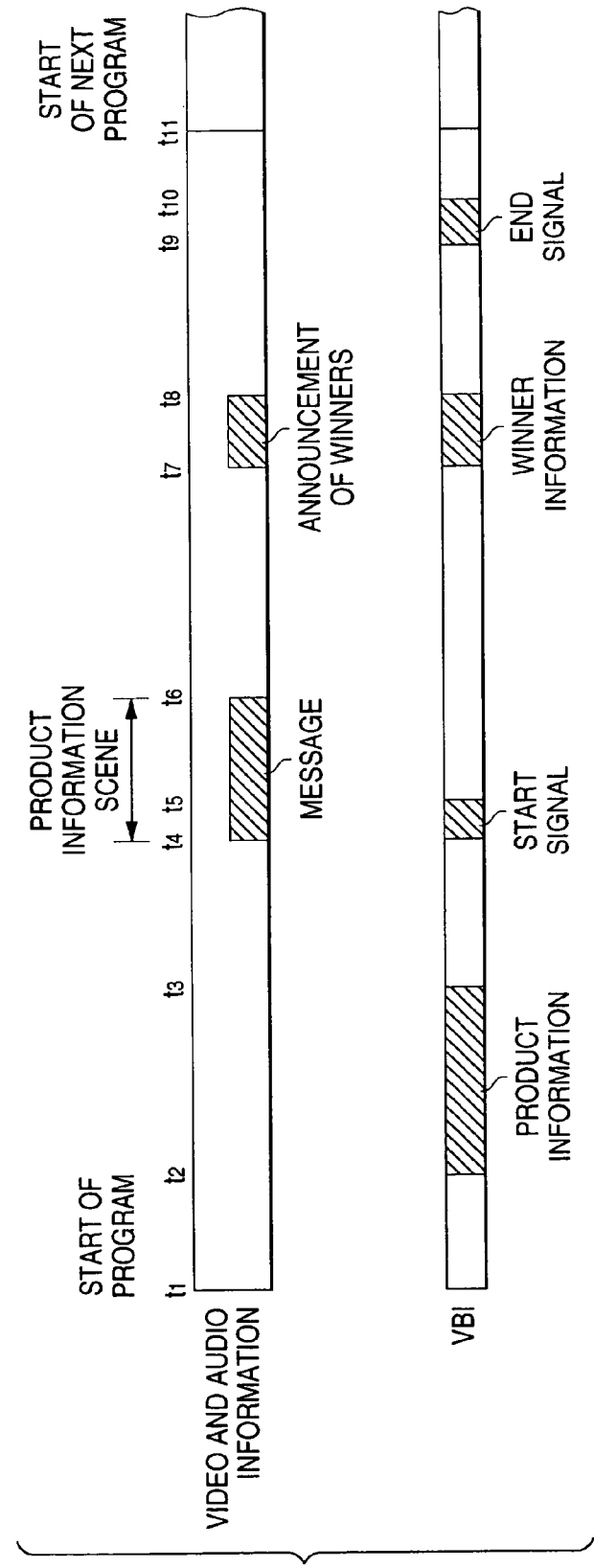
FIG. 7 is a timing chart showing the operation of the broadcasting station of FIG. 3.

Next, the process of the broadcasting station 1 will be described below with reference to a flowchart of FIG. 6. At step S1, an operation of transmitting program information is performed; that is, a video signal and an audio signal of a program are transmitted from the output section 32 to homes via the antenna 2. In this manner, for example, as shown in FIG. 7, transmission of the video signal and the audio signal of the program is started at time t1.

At step S2, the combining section 31 performs an operation of inserting product information into VBIs (vertical blanking intervals). That is, product information relating to a product to be presented to viewers is superimposed on horizontal scanning lines in VBIs. A video signal on which the product information is superimposed in VBIs is output from the combining section 31 and transmitted from the output section 32 via the antenna 2.

The product information is information on a product that is actually used in the program, for example, a drama. For example, where a prescribed actress Y uses a cosmetic product in the program from time t4 to t6, a message to the effect that the cosmetic product will be presented to viewers is superimposed as product information in the period from time t2 to t3 that precedes time t4.

Figure 8:
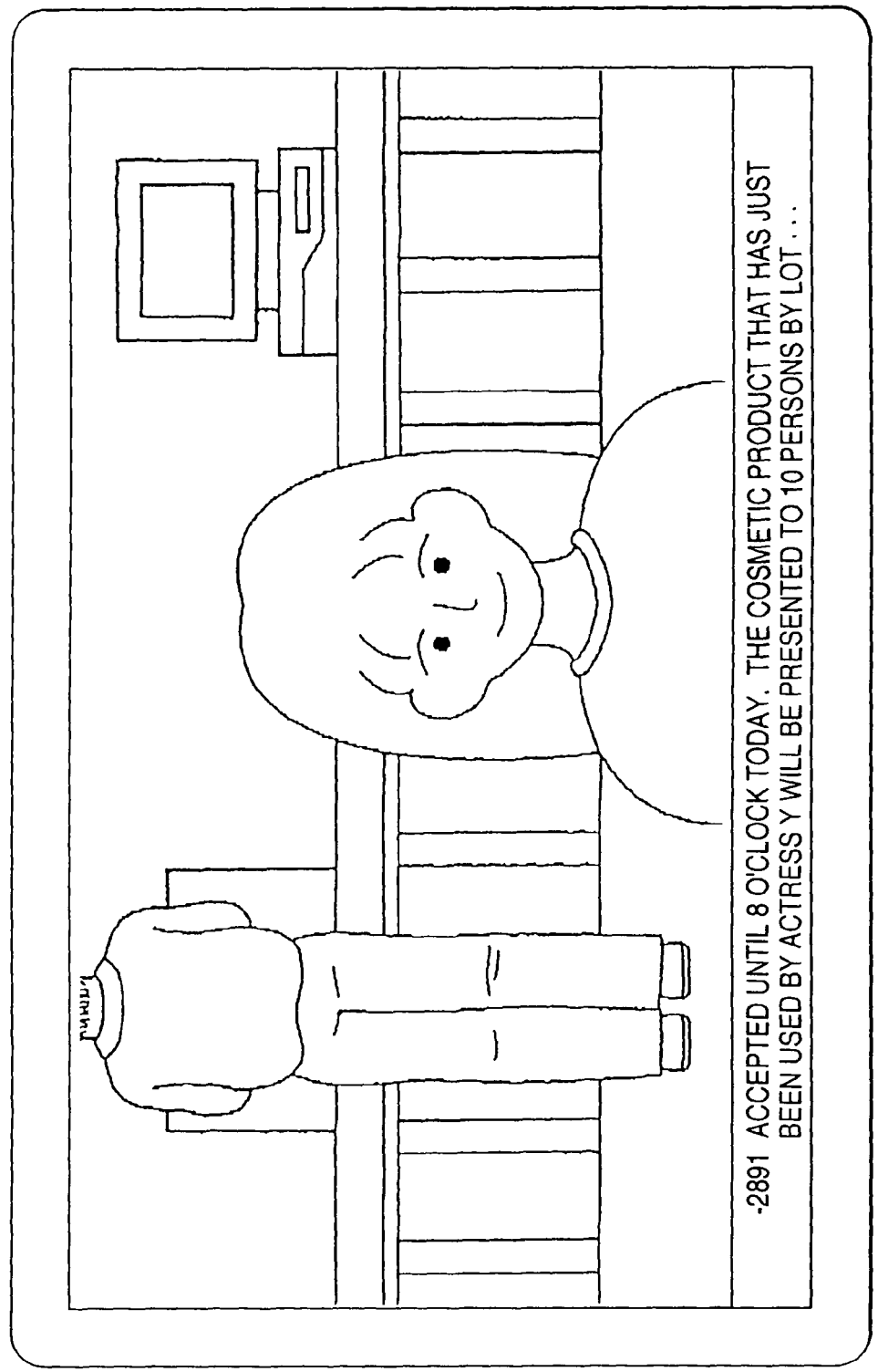
FIG. 8 shows an example display of a message relating to lot.

At step S3, the combining section 31 judges whether the broadcast time of the target scene (product information scene) of the program in which to introduce the product to be presented has been reached. The combining section 31 waits for that broadcast time. If it is judged that the broadcast time of the product information scene has been reached (time t4 in the example of FIG. 7), the process goes to step S4, where the combining section 31 inserts a start signal into VBIs to time t5. As described later, the decoder 3 starts to display the message when detecting the start signal. As a result, for example, a picture shown in FIG. 8 is displayed on the TV receiver 4.

Figure 9:
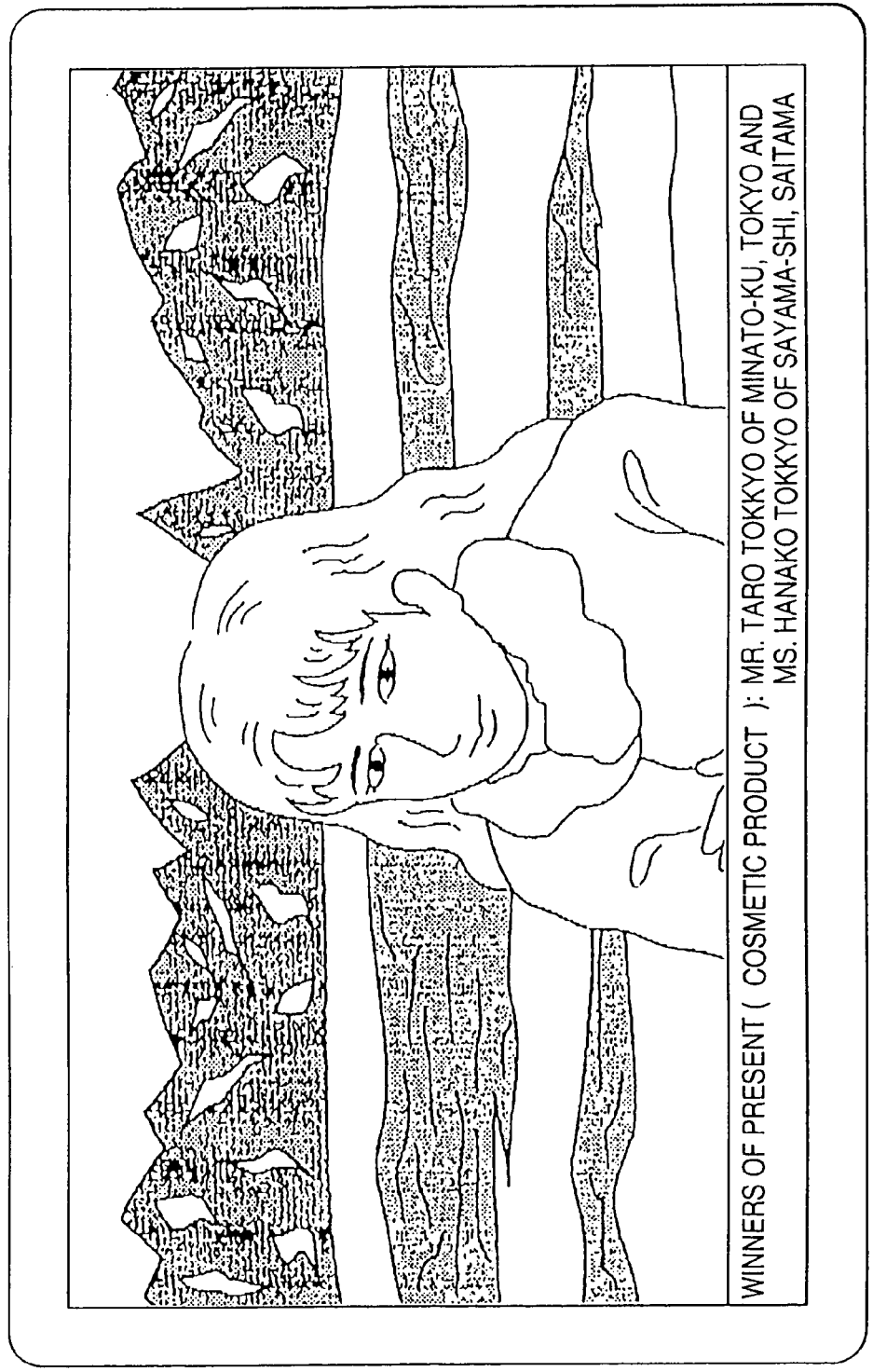
FIG. 9 shows an example display of winners of a present.

If the viewer 5 wants to enter the lot for the present after seeing the displayed message, he manipulates the decoder 3 for that purpose. After such manipulation have been performed, as described later, the auxiliary servers 23-1 to 23-3 and the main server 23-4 draw lots and a drawing result is transmitted to the broadcasting station 1. At step S5, the combining section 31 judges whether winner information has been received. If winner information has not been received yet, the combining section 31 waits until it is transmitted from the main server 24. If winner information has been received, at step S6 the combining section 31 inserts winner information such as the names, addresses, etc. of winners into VBIs of a video signal of the program. This winner information is to allow each viewer 5 to recognize the winners even after the end of the program. At step S7, the combining section 31 superimposes the winner information on the effective portion of a video signal. This step is executed from time t7 to time t8 in the timing chart of FIG. 7. As a result, for example, a picture shown in FIG. 9 is displayed on the TV receiver 4. Step S7 is executed to announce the winners to each viewer 5 during the broadcast of the program.

At step S8, the combining section 31 inserts an end signal into VBIs from time t9 to t10. When receiving the end signal, the decoder 3 finishes the present providing system operation relating to the program.

The above operation is performed for one program. A similar operation will be performed for the next program that will start at time t11.

Although in the above example one present is provided in one program, naturally a plurality of presents may be provided in one program.

Figure 10:
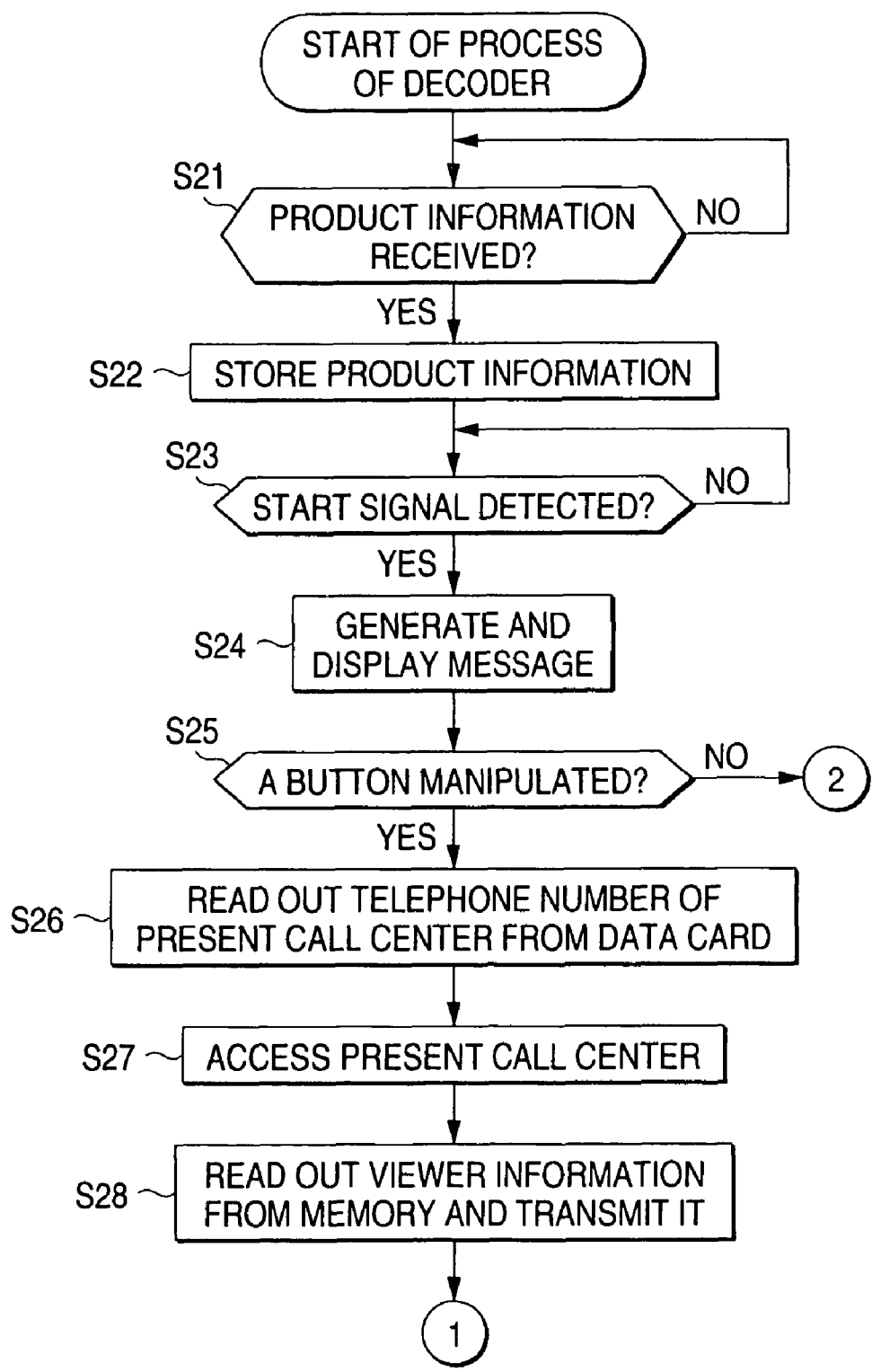
FIGS. 10 and 11 are flowcharts showing the process of the decoder of FIG. 4.
Figure 11:
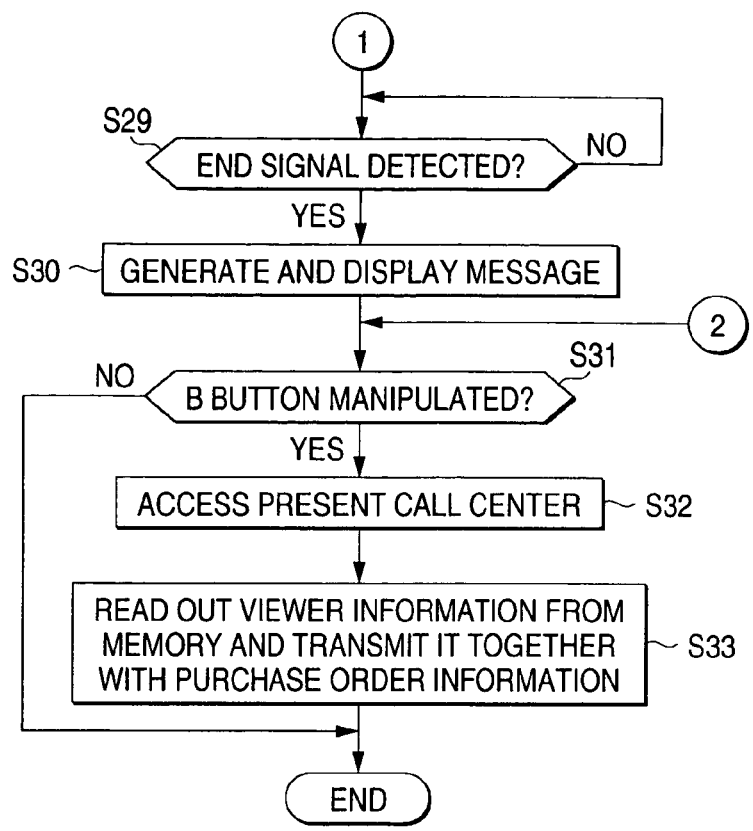

Next, the process of the decoder 3 will be described with reference to flowcharts of FIGS. 10 and 11. This process is started when the viewer 5 commands viewing of a program on a prescribed channel by manipulating the input section 70. At this time, the CPU 66 controls the tuning section 61 and causes it to receive a signal of the program on the prescribed channel via the antenna 51. A reception signal is supplied to the signal processing section 62, where it is demodulated and separated into a video signal and an audio signal. The video signal is output to the TV receiver 4 via the combining section 63 and the audio signal is supplied directly to the TV receiver 4.

The data extraction section 64 extracts data that is superimposed on the video signal that is output from the tuning section 61 (in VBIs) and outputs the extracted data to the data processing section 65. The data processing section 65 processes the received data into data that can be processed by the CPU 66 and outputs it to the CPU 66. At step S21, the CPU 66 monitors the output of the data processing section 65 and waits for reception of the product information (that will be transmitted from time t2 to t3 in FIG. 7).

When receiving the product information, at step S22 the CPU 66 supplies the received product information to the memory 69 and has it stored there. Only relatively small information can be inserted into VBIs. Therefore, as described above with reference to FIG. 7, the information relating to the message to be displayed from time t4 to t6 is stored in the memory 69 in advance in the period from time t2 to t3 that precedes time t4 when the actual product information scene will start to be broadcast.

The CPU 66 waits until it is judged at step S23 that the start signal has been detected from VBIs. When receiving the start signal, at step S24 the CPU 66 performs a message generation and display operation. That is, the CPU 66 reads out, from the memory 69, the product information that was stored there in advance at step S22, and generates a message by utilizing the kanji ROM 67 when necessary. As a result, a message such as "The cosmetic product that has just been used by actress Y will be presented to 10 persons by lot. Please push the "entry" button (A button) on the remote commander or the decoder 3." is generated. The generated message is supplied to the encoder 72 and converted into an NTSC video signal there. The NTSC video signal is combined by the combining section 63 with a video signal that is supplied from the signal processing section 62. A resulting video signal is output from the combining section 63 to the TV receiver 4 and displayed thereon. In this manner, for example, a picture shown in FIG. 8 is displayed on the TV receiver 4.

To enter the lot for the present, the viewer 5 manipulates the A button on the input section 70 that is a remote commander, for example. At step S25, the CPU 66 judges whether the A button has been manipulated. If it is judged that the A button has been manipulated, the process goes to step S26, where the CPU 66 reads out the telephone number of the present call center 7 from the data card 53. The telephone number of the auxiliary server 23-1 is stored in data cards 53 that are distributed in the area 21-1. The telephone numbers of the auxiliary servers 23-2 and 23-3 are stored in data cards 53 that are distributed in the areas 21-2 and 21-3, respectively. Therefore, the telephone number of the auxiliary server in the corresponding area is read out at step S26.

At step S27, the CPU 66 controls the communication section 71 and causes it to access the present call center 7 having the telephone number that was read out at step S26. Controlled by the CPU 66, the communication section 71 causes, via the antenna 52, the telephone 81 to call the present call center 7. At step S28, the CPU 66 reads out the viewer information that is stored in the memory 69 in advance and has it transmitted to the present call center 7. The viewer information, which is the address, name, telephone number, etc. of the viewer 5, is information that was input in advance by the viewer (user) 5 by manipulating the input section 70 when he started to use the decode 3.

As described later, each of the auxiliary servers 23-1 to 23-3 as the present call center 7 performs an operation of determining, by lot, a prescribed number of entrants as winner candidates from a plurality of entrants in the corresponding area 21-1, 21-2, or 21-3 who have entered the lot in the above manner.

The CPU 66 waits until it is judged at step S29 that the end signal is detected from VBIs. When detecting the end signal, at step S30 the CPU 66 performs an operation of generating a message corresponding to the product information stored in the memory 69 and displaying it. As a result, a message such as "Persons who lost in the lot can buy by the same product 20% off the fixed price. Please push the B button for purchase." is generated, output from the encoder 72 to the TV receiver 4 via the combining section 63, and displayed on the TV receiver 4.

As described above, when winners have been determined by lot from viewers 5 who entered the lot for the present by manipulating the A button, the names of the winners are broadcast in the program. When looking at the message, each viewer 5 can judge whether he has won in the lot. If the viewer 5 has not won in the lot but wants to buy the product, he manipulates the B button of the remote commander as the input section 70. At step S31, the CPU 66 judges whether the B button has been manipulated. If is judged that the B button has been manipulated, at step S32 the CPU 66 controls the communication section 71 and causes it to access the present call center 7 again. At step S33, the CPU 66 causes the communication section 71 to transmit, to the present call center 7, together with purchase order information, the viewer information that was read out from the memory 69.

If it is judged at step S25 that the A button has not been manipulated, steps S26-S30 are skipped and it is judged at step S31 whether the B button has been manipulated. Therefore, the viewer 5 can buy the product by manipulating the B button even if he did not manipulate the A button (that is, even if he did not enter the lot for the present).

If it is judged at step S31 that B button has not been manipulated, steps S32 and S33 are skipped.

Figure 12:
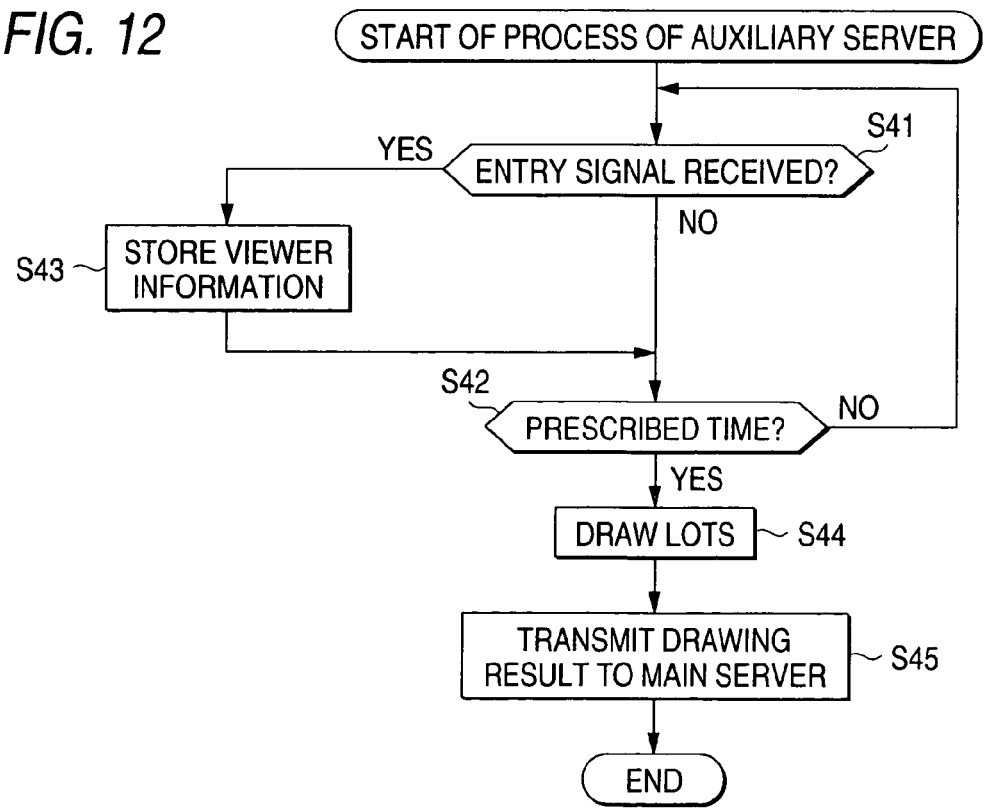
FIG. 12 is a flowchart showing the process of an auxiliary server shown in FIG. 2.

Next, the process of each of the auxiliary servers 23-1 to 23-3 will be described with reference to a flowchart of FIG. 12. At step S41, the CPU 91 of the auxiliary server 23-1 in the area 21-1, for example, judges whether a signal of entry to the lot for the present has been received from the viewers 5-1-1 to 5-1-5 in the area 21-1. If such a signal has not been received, the process goes to step S42, where it is judged whether prescribed time (i.e., the end of the entry acceptance period) has been reached. If the present time has not reached the end of the entry acceptance period, the process returns to step S41 and the subsequent steps are executed again. If it is judged at step S41 that an entry signal has been received, at step S43 the CPU 91 stores the transmitted viewer information of the entrant in a database in the hard disk drive 95. Then, the process goes to step S42 to execute the same steps again.

If it is judged at step S42 that the prescribed time has been reached, the process goes to step S44, where the CPU 91 draws lots. That is, the CPU 91 determines, by lot, a prescribed number of entrants as winner candidates from a plurality of entrants that have been stored so far in the hard disk drive 95. At step S45, the CPU 91 controls the communication section 96 and causes it to transmit information of the thus-determined winner candidates (drawing result) to the main server 24.

Figure 13:
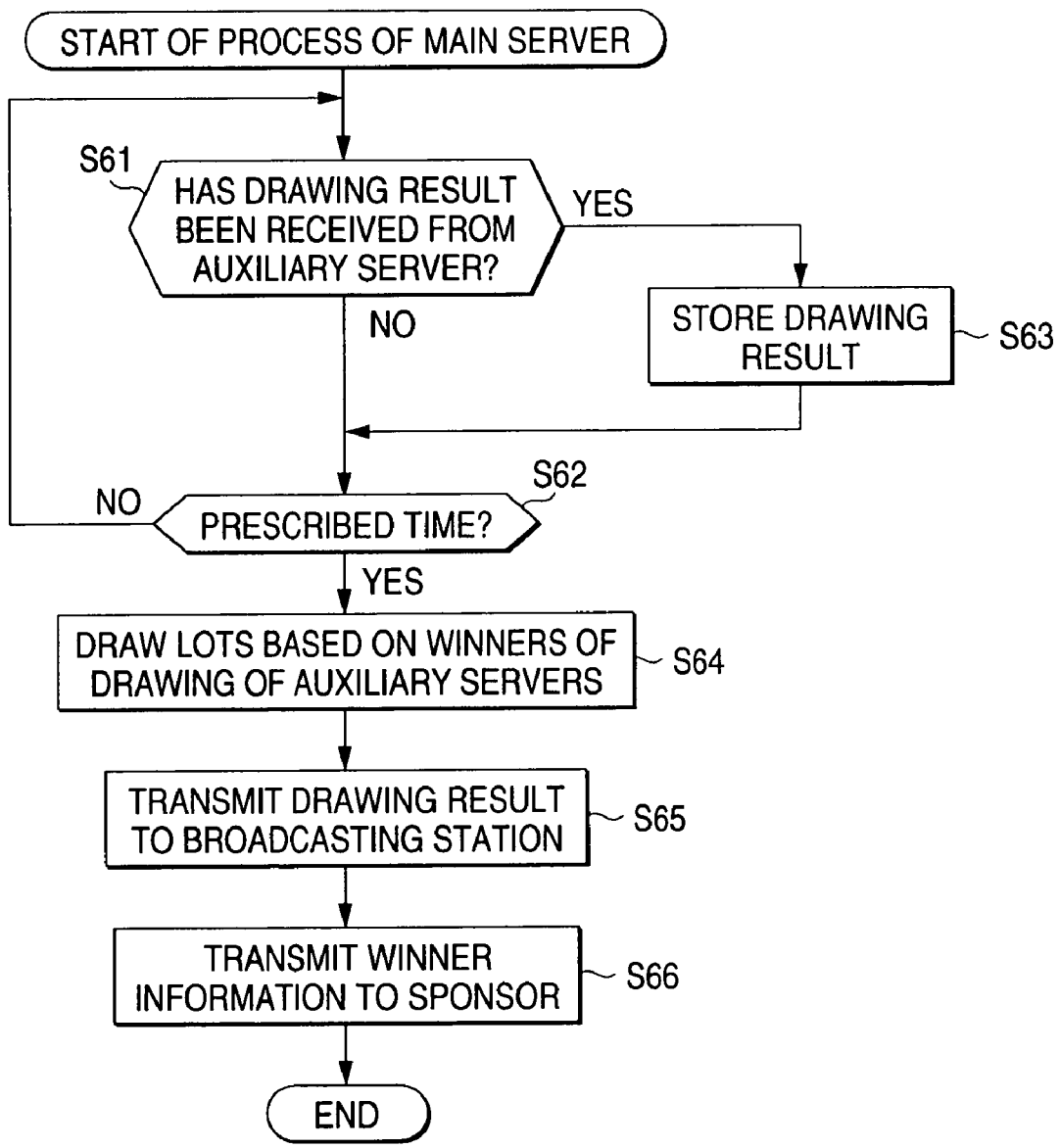
FIG. 13 is a flowchart showing a process of the main server of FIG. 5.

Next, the process of the main server 24 will be described with reference to a flowchart of FIG. 13. At step S61, the CPU 91 of the main server 24 judges whether a drawing result has been received from any of the auxiliary servers 23-1 to 23-3. If no drawing result has been received yet, the process goes to step S62, where the CPU 91 judges whether prescribed time has been reached. The prescribed time is determined in consideration of time that is necessary for each of the auxiliary servers 23-1 to 23-3 to determine, by lot, winner candidates from entrants in the corresponding area 21-1, 21-2, or 21-3 and then transmit related information. If it is judged at step S62 that the present time has not reached the prescribed time, the process returns to step S61 and the subsequent steps are executed again. If it is judged at step S61 that a drawing result has been transmitted from any of the auxiliary servers 23-1 to 23-3, the process goes to step S63, where the CPU 91 supplies the transmitted information to the hard disk drive 95 and causes the hard disk drive 95 to store the information. Then, the process goes to step S62 to execute the same steps again.

If it is judged at step S62 that the present time has reached the prescribed time, the process goes to step S64, where the CPU 91 determines, by lot, final winners from the winners in the areas 21-1 to 21-3 that are stored in the hard disk drive 95. When winners have been determined, at step S65 the CPU 91 controls the communication section 96 and causes it to transmit a drawing result, that is, the names and the addresses of the winners, to the broadcasting station 1. As described above with reference to FIG. 6, when receiving the winner information, at step S6 the broadcasting station 1 broadcasts the winner information by inserting it into VBIs. At step S66, the CPU 91 controls the communication section 96 and causes it to transmit winner information (addresses, names, ages, telephone numbers, etc.) to the sponsor 10 over a telephone line, a network, or the like. Provided with the winner data from the main server 24 (or the network manager 9), the sponsor 10 sends the present product to the winners.

Figure 14:
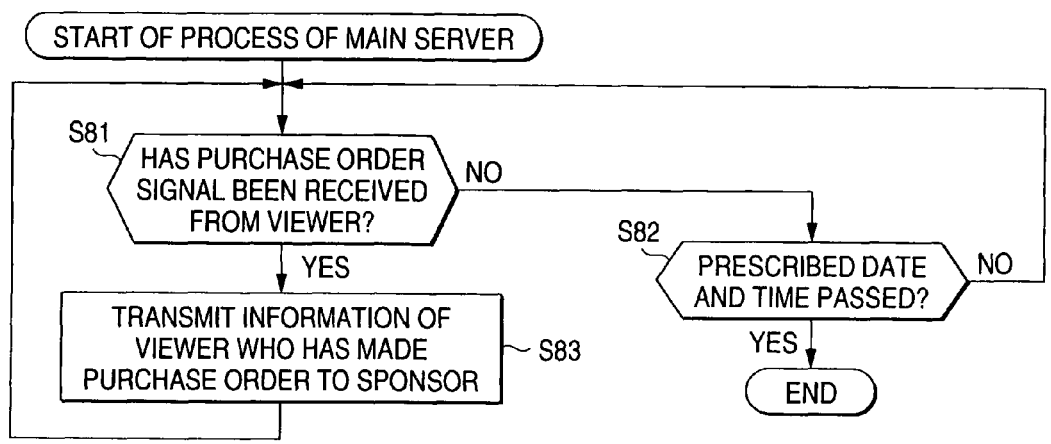
FIG. 14 is a flowchart showing another process of the main server of FIG. 5.

It is possible to perform a product purchase operation even after the end of the program. To this end, the main server 24 executes a process shown in a flowchart of FIG. 14 even after the end of the program. At step S81, the CPU 91 judges whether a purchase order signal has been received from a viewer. If no such signal has been received, the process goes to step S82, where the CPU 91 judges whether the present time has passed a preset date and time until which a purchase order of the product concerned is accepted. If the present time has not passed the preset date and time, the process returns to step S81 and executes the subsequent steps again. If it is judged at step S82 that the preset date and time have been passed, the process is finished.

If it is judged at step S81 that a purchase order signal has been received from a viewer, the process goes to step S83, where the CPU 91 transmits, to the sponsor 10, information of the viewer who has made the purchase order. Then, the process returns to step S81 and the subsequent steps are executed again.

Figure 15:
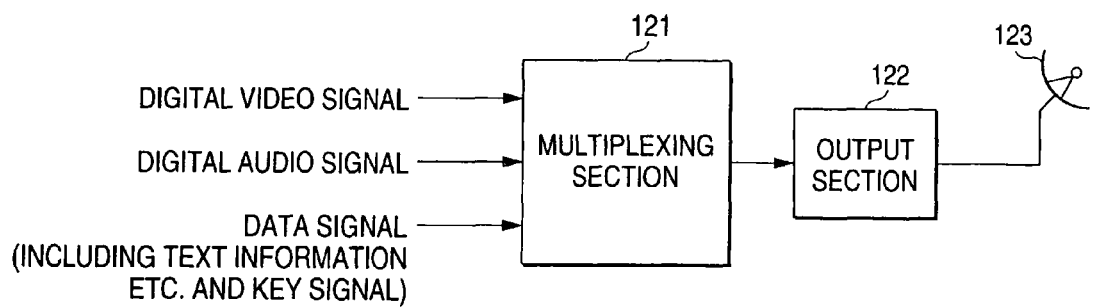
FIG. 15 is a block diagram showing another example configuration of the broadcasting station shown in FIG. 1.

Although in the above description the lots-drawing system according to the invention is applied to the analog (ground wave) television broadcasting system, the invention can also be applied to a digital broadcasting system. In the latter case, for example, the broadcasting station 1 is configured as shown in FIG. 15. In this example configuration, a multiplexing section 121 multiplexes a digital video signal, a digital audio signal and a digital data signal. The digital data signal includes text information and a key signal. An output section 122 modulates a signal produced by the multiplexing section 121 and transmits a modulated signal to a satellite (not shown) via a parabola antenna 123.

Figure 16:
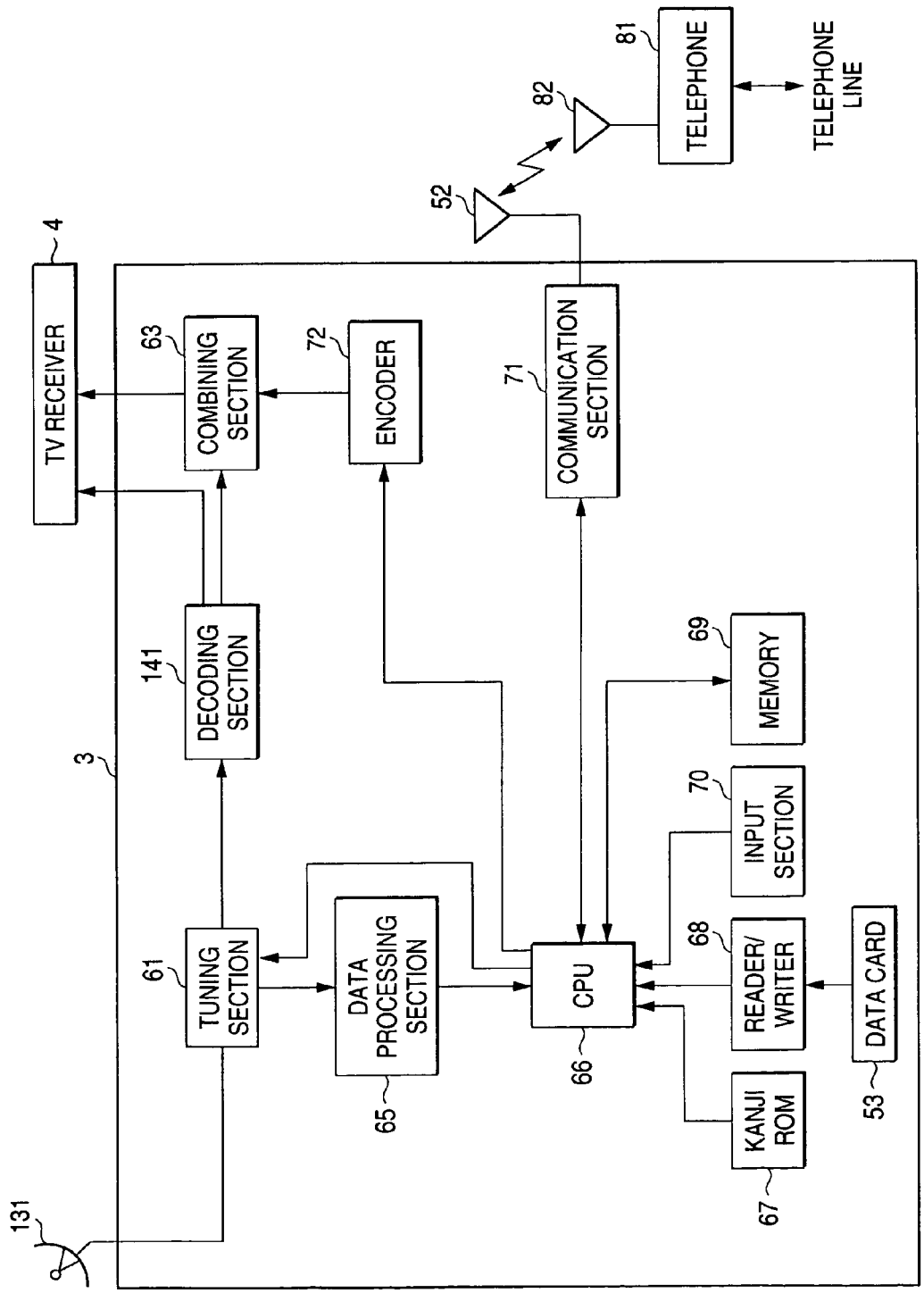
FIG. 16 is a block diagram showing another example configuration of the decoder shown in FIG. 1.

In this case, for example, the decoder 3 is configured as shown in FIG. 16. This configuration is the same as shown in FIG. 4 except that a parabola antenna 131 receives radio waves that are transmitted from the broadcasting station 1 via the satellite, and that a decoding section 141 decodes a signal on a prescribed channel that is supplied from a tuning section 61 and outputs a resulting video signal to a combining section 63 and a combined signal is output to the TV receiver 4.

Figure 17:
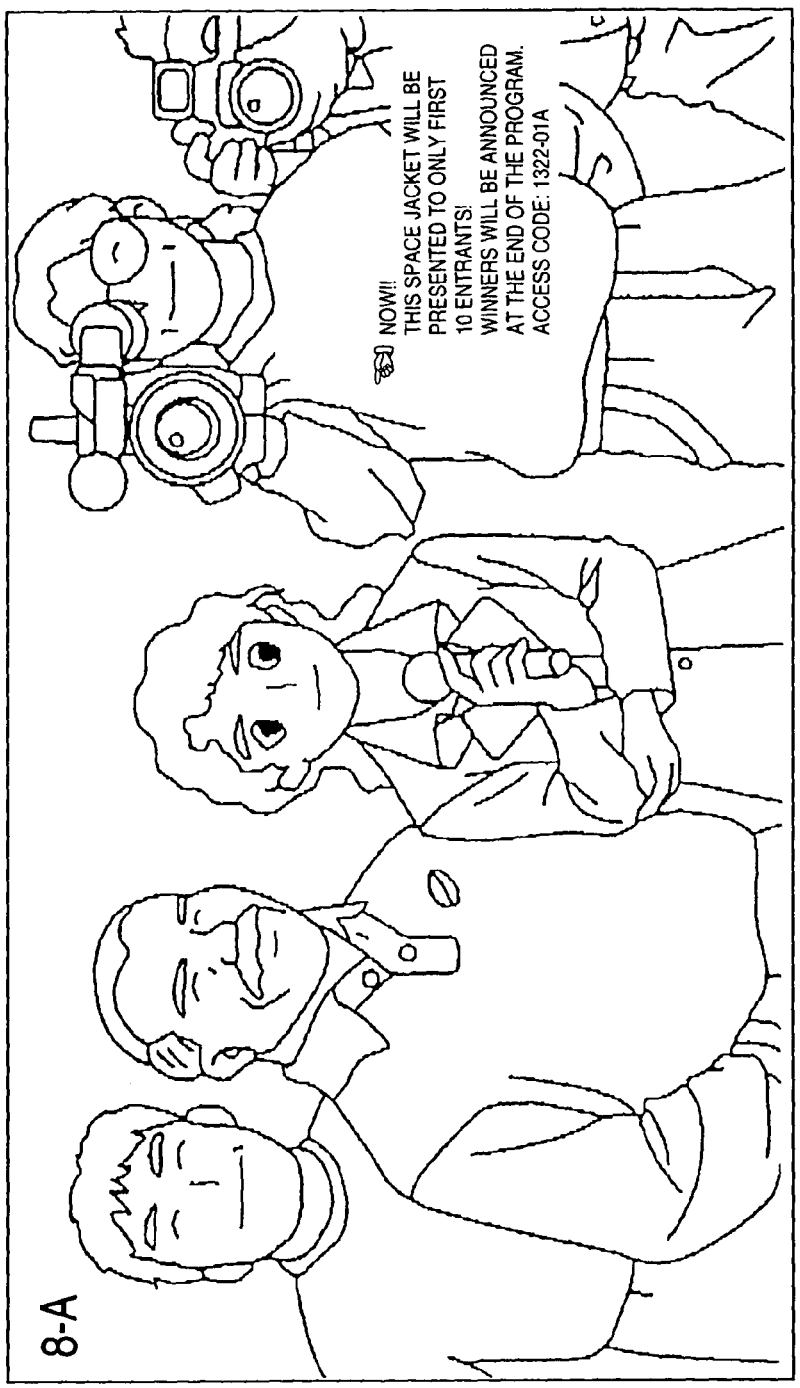
FIG. 17 shows another example display of a message relating to a present.
Figure 18:
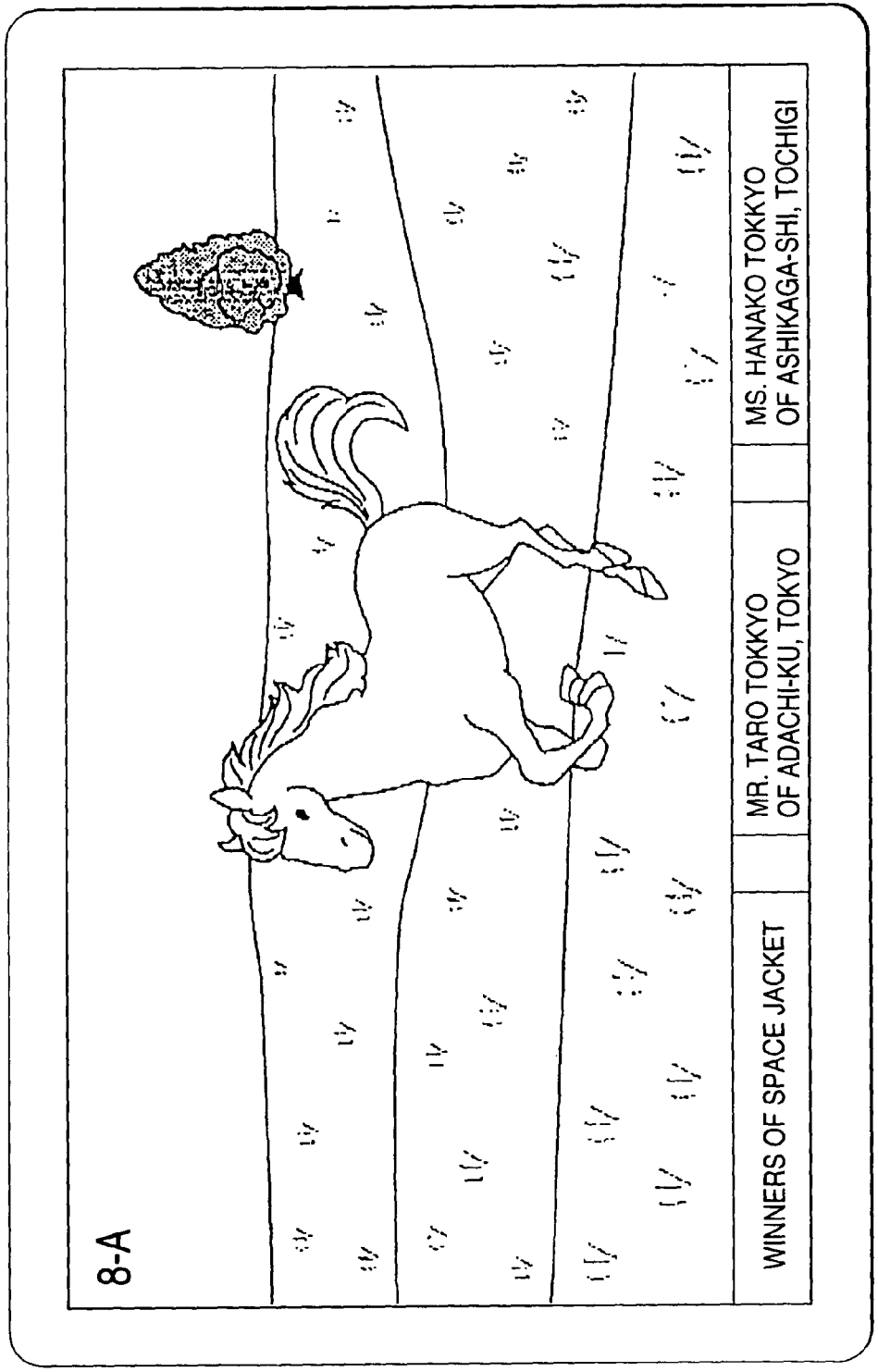
FIG. 18 shows another example display for announcement of winners.

The processes that are executed in the digital broadcasting system are basically the same as in the analog broadcasting system and hence will not be described. However, in the digital broadcasting system, product information having a larger information amount can be transmitted than in the analog broadcasting system. Therefore, for example, a present message can be displayed in a manner shown in FIG. 17 and winners can be displayed in a manner shown in FIG. 18 in which not only the address and the name of each winner but also a photograph of his or her face is displayed. Naturally, to this end, it is necessary to capture a photograph of the face of a winner from each decoder 3 as viewer information.

Next, with reference to FIGS. 19A-19C, a description will be made of media that are used to install programs for enabling the above-described series of processes in the broadcasting station 1, the decoder 3, the automatic lots-drawing system 8 (the main server 24 and the auxiliary servers 23-1 to 23-3) so that the programs can be executed by the respective apparatuses.

Figure 19A:
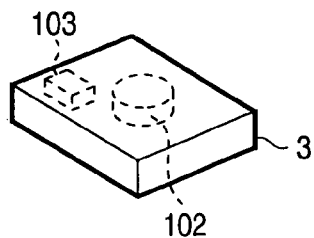
FIGS. 19A-19C show example media.

As shown in FIG. 19A, a program can be provided to a user in a state that it is pre-installed in a hard disk drive 102 or a semiconductor memory 103 (corresponding to the memory 69 shown in FIG. 4) as a recording medium that is incorporated in each apparatus as typified by the decoder 3.

Figure 19B:
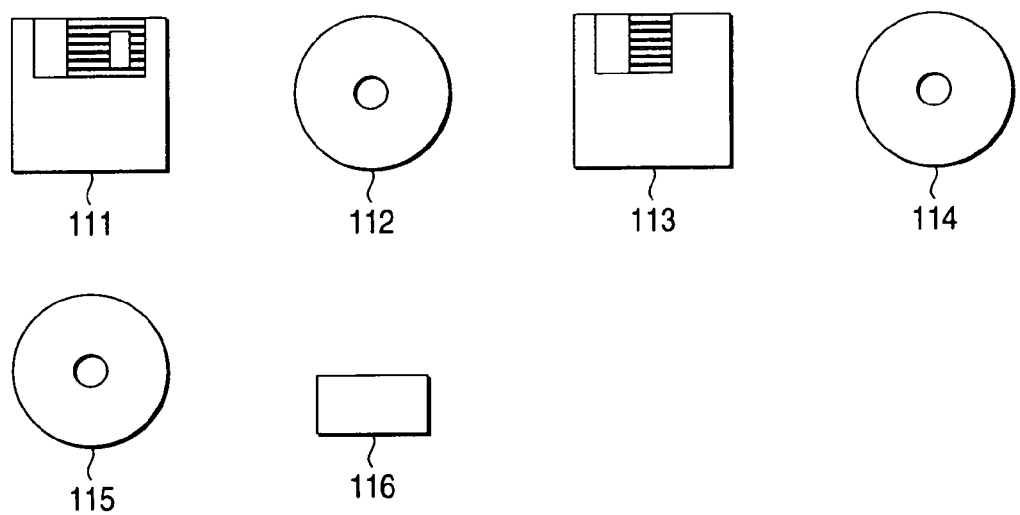

Alternatively, as shown in FIG. 19B, a program can be stored temporarily or permanently in a recording medium such as a floppy disk 111, a CD-ROM (compact disc-read only memory) 112, an MO (magneto-optical) disc 113, a DVD (digital versatile disc) 114, a magnetic disk 115, or a semiconductor memory (corresponding to the data card 53 shown in FIG. 4) and can be provided as package software.

Figure 19C:
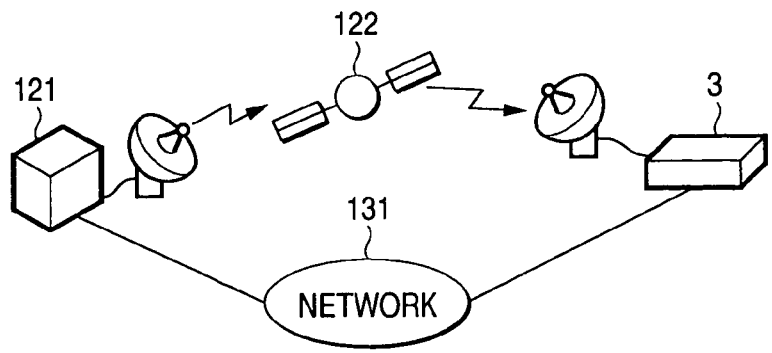

As a further alternative, as shown in FIG. 19C, a program can be stored in a memory incorporated in the decoder 3 by transferring it by radio from a download site 121 to the decoder 3 via an artificial satellite 122 for digital satellite broadcast or transferring it by wire from the download site 121 to the decoder 3 over a network 131 such as a local area network or the Internet.

The term "medium" as used in this specification is a broad concept including all of the above media.

In this specification, steps that describe a program provided by a medium may be executed either in the time-series order as described in the specification or in parallel or individually.

In this specification, the term "system" means the entire apparatus composed of a plurality of apparatuses.

What is claimed is:

1. An information providing apparatus comprising:
   first combining means for combining product information and gift information of a product relating to a drawing to be performed, with information of a completed broadcast program showing the product to thereby provide first combined information, and outputting the first combined information for broadcast transmission to a plurality of end users;
   first judging means for judging whether the broadcast time of a target scene of a broadcast program in which to introduce the product to be presented has been reached;
   inserting means for inserting a start signal into said broadcast program when said target scene has been reached;
   receiving means for receiving drawing result information indicating at least one winner of the drawing from a facility that determines the drawing winners, the drawing results being generated based on participation of the plurality of end users that is transmitted from an end user equipment;
   second combining means for combining the drawing result information received by the receiving means with information of the broadcast program to thereby provide second combined information, and outputting the second combined information including the drawing winners for broadcast transmission to a plurality of end user equipment via a uni-directional network; and
   second judging means for judging whether an alternative button depression has been manipulated corresponding to re-accessing a call center with an updated purchase order independent of said first judging means,
   wherein a photograph of the drawing winner with information of a completed broadcast program is displayed at the plurality of end user equipment, and
   wherein the product is used in the broadcast program and a displaying period of a message announcing the drawing matches a displaying period during which the product is used in the broadcast program and the start signal is inserted between the outputting of the first combined information and the outputting of the second combined information.

2. The information providing apparatus according to claim 1, further comprising third combining means for combining a signal indicating a time point when to display the information relating to the drawing with information of the broadcast program, and outputting combined information.

3. The information providing apparatus according to claim 1, wherein the product information relating to the drawing is product information relating to a product to be presented to viewers in the broadcast program.

4. The information providing apparatus according to claim 3, wherein the end user equipment is television equipment.

5. The information providing apparatus according to claim 1, wherein the product information relating to the drawing is product information relating to a product marketed by a sponsor of the broadcast program.

6. The information providing apparatus according to claim 1, wherein the first combining means inserts the product information relating to the drawing into blanking intervals of the information of the broadcast program.

7. The information providing apparatus according to claim 1, wherein the second combining means superimposes the drawing result information on an effective portion of a video signal of the broadcast program, whereby information of at least one prize winner is broadcast superimposed on the effective portion of the broadcast program video signal for subsequent display at the plurality of end user equipment.

8. An information providing method comprising the steps of:
   combining product information and gift information of a product relating to a drawing to be performed with information of a completed broadcast program showing the product to thereby provide first combined information, and outputting the combined information for broadcast transmission to a plurality of end users;
   judging whether the broadcast time of a target scene of a broadcast program in which to introduce the product to be presented has been reached;
   inserting a start signal into said broadcast program when said target scene has been reached;
   receiving drawing result information indicating at least one winner of the drawing from a facility that determines the drawing winners, the drawing results being generated based on participation of the plurality of end users that is transmitted from an end user equipment;
   combining the received drawing result information with information of the broadcast program, to thereby provide second combined information, and outputting the second combined information including the drawing winners for broadcast transmission to a plurality of end user equipment via a uni-directional network;
   displaying a photograph of the drawing winner with information of a completed broadcast program at the plurality of end user equipment;
   judging whether an alternative button depression has been manipulated corresponding to re-accessing a call center with an updated purchase order; and
   superimposing the product information that is used in the broadcast program on horizontal scanning lines in vertical blanking intervals,
   wherein a displaying period of a message announcing the drawing matches a displaying period during which the product is used in the broadcast program and the start signal is inserted between the outputting of the first combined information and the outputting of the second combined information.

9. An information receiving apparatus comprising:
   extracting means for extracting product information and gift information of a product relating to a drawing to be performed that has been combined with information of a completed broadcast program showing the product and being provided via a uni-directional network;
   display control means for generating a message about a gift of the product based on the product information and the gift information of the product relating to the drawing that has been extracted by the extracting means, and displaying the message with the product;
   entry judging means for judging whether an instruction to enter the drawing has been input;
   storing means for storing information of an entry destination of the drawing;
   means for reading and writing data to a data card;
   execution means for performing an operation of entering the drawing by communicating with the entry destination that is stored in the storing means based on a judgment result of the entry judging means;

receiving means for receiving drawing result information indicating at least one winner of the drawing from a facility that determines the drawing winners, the drawing results being generated based on participation of the plurality of end users that is transmitted from an end user equipment;

second judging means for judging whether an alternative button depression has been manipulated corresponding to re-accessing a call center with an updated purchase order, wherein a photograph of the drawing winner with information of a competed broadcast program is displayed at the plurality of end user equipment, and wherein the product is used in the broadcast program and a displaying period of a message announcing the drawing matches a displaying period during which the product is used in the broadcast program and the start signal is inserted between the outputting of the first combined information and the outputting of the second combined information.

10. The information receiving apparatus according to claim 9, wherein the storing means further stores an access destination to be accessed in buying a product corresponding to the drawing, the information receiving apparatus further comprising:

purchase judging means for judging whether an instruction to buy the product corresponding to the drawing has been input; and accessing means for performing an operation of accessing the access destination that is stored in the storing means based on a judgment result of the purchase judging means.

11. The information receiving apparatus according to claim 9, wherein the product information relating to the drawing is product information relating to a product to be presented to viewers.

12. The information receiving apparatus according to claim 11, wherein the product is a product that is used in the broadcast program.

13. The information receiving apparatus according to claim 11, wherein the product is a product that is marketed by a sponsor of the broadcast program.

14. An information receiving method comprising the steps of:

extracting product information and gift information of a product relating to a drawing to be performed that has been combined with information of a completed broadcast program showing the product and being provided via a uni-directional network;

generating a message about a gift of the product based on the product information and the gift information of the product relating to the drawing that has been extracted by the extracting step, and displaying the message with the product;

judging whether an instruction to enter the drawing has been input;

storing information of an entry destination of the drawing;

reading and writing data to a data card;

performing an operation of entering the drawing by communicating with the entry destination that was stored in the storing step based on a judgment result of the entry judging step, receiving drawing result information indicating at least one winner of the drawing from a facility that determines the drawing winners, the drawing results being generated based on participation of the plurality of end users that is transmitted from an end user equipment, wherein said operation of entering the drawing requires program and data previously stored in said data card; and judging whether an alternative button depression has been manipulated corresponding to re-accessing a call center with an updated purchase order, wherein a photograph of the drawing winner with information of a completed broadcast program is displayed at the plurality of end user equipment, and wherein the product is used in the broadcast program and a displaying period of a message announcing the drawing matches a displaying period during which the product is used in the broadcast program and the start signal is inserted between the outputting of the first combined information and the outputting of the second combined information.

15. An information processing apparatus comprising:

entry accepting means for accepting an entry corresponding to gift information and product information of a product relating to a drawing to be performed that has been combined with information of a completed broadcast program showing the product and being provided via a uni-direction network;

determining means for determining winners of the drawing from entrants accepted by the entry accepting means, wherein said determining means includes:

a plurality of first determining means, wherein each first determining means determines winner candidates of a drawing based on entrants of a lot located within a prescribed area from a provider of said broadcast program; and a second determining means that receives determined winner candidate information from each of said plurality of first determining means and determines said winners of the drawing from said received determined winner candidate information;

output means for outputting a determination result of the determining means to a provider of the broadcast program while the broadcast program is being provided; and judging means for judging whether a purchase order signal is received, wherein the drawing results are generated based on participation of the plurality of end users that is transmitted from an end user equipment, wherein a photograph of the drawing winner with information of a completed broadcast program is displayed at the plurality of end user equipment, and wherein the product used in the broadcast program and a displaying period of a message announcing the drawing matches a displaying period during which the product is used in the broadcast program and the start signal is inserted between the outputting of the first combined information and the outputting of the second combined information.

16. The information processing apparatus according to claim 15, further comprising:

purchase accepting means for accepting a purchase order for a product corresponding to the drawing; and transmitting means for transmitting information of a person who has made the purchase order that has been accepted by the purchase accepting means to a sponsor of the product corresponding to the drawing in response to acceptance by the purchase accepting means.

17. The information processing apparatus according to claim 16, wherein the product is a product that is used in the broadcast program.

18. The information processing apparatus according to claim 16, wherein the product is a product that is marketed by a sponsor of the broadcast program.

19. An information processing method comprising:

accepting an entry corresponding to product information and gift information of a product relating to a drawing to be performed that has been combined with information of a completed broadcast program showing the product and being provided via a uni-direction network;

determining winners of the drawing from entrants accepted by the entry accepting step, wherein said determining includes:

first determining winner candidates of a drawing based on at least one set of entrants of a lot located within a prescribed area from a provider of said broadcast program; and second determining said winners of the drawing from said determined winner candidates based on at least one set of entrants of a lot;

outputting a determination result of the determining step to a provider of the broadcast program while the broadcast program is being provided; and judging whether a purchase order signal is received, wherein the drawing results are generated based on participation of the plurality of end users that is transmitted from an end user equipment, wherein a photograph of the drawing winner with information of a completed broadcast program is displayed at the plurality of end user equipment, and wherein the product used in the broadcast program and a displaying period of a message announcing the drawing matches a displaying period during which the product is used in the broadcast program and the start signal is inserted between the outputting of the first combined information and the outputting of the second combined information.

* * * * *